(12) United States Patent
Bessios

(10) Patent No.: US 6,917,312 B2
(45) Date of Patent: Jul. 12, 2005

(54) TECHNIQUE FOR IMPROVING THE QUALITY OF DIGITAL SIGNALS IN A MULTI-LEVEL SIGNALING SYSTEM

(75) Inventor: Anthony Bessios, Fremont, CA (US)

(73) Assignee: Rambus Inc., Los Altos, CA (US)

( * ) Notice: Subject to any disclaimer, the term of this patent is extended or adjusted under 35 U.S.C. 154(b) by 50 days.

(21) Appl. No.: 10/703,631

(22) Filed: Nov. 10, 2003

(65) Prior Publication Data

US 2005/0099325 A1 May 12, 2005

(51) Int. Cl.[7] .................................................. H03M 5/02
(52) U.S. Cl. ........................... 341/56; 341/58; 341/59; 375/286; 375/353
(58) Field of Search ............................ 341/56, 59, 58, 341/50; 375/286, 353, 232

(56) References Cited

U.S. PATENT DOCUMENTS

| | | | | |
|---|---|---|---|---|
| 5,640,163 A | * | 6/1997 | Nauta et al. ................. | 341/155 |
| 5,812,079 A | * | 9/1998 | Ito et al. ...................... | 341/163 |
| 6,211,803 B1 | * | 4/2001 | Sunter ......................... | 341/120 |
| 6,538,584 B2 | * | 3/2003 | Borkar et al. ................. | 341/58 |
| 6,696,988 B2 | * | 2/2004 | Chen ............................ | 341/50 |

* cited by examiner

*Primary Examiner*—Don Le
*Assistant Examiner*—Lam T. Mai
(74) *Attorney, Agent, or Firm*—Hunton & Williams LLP

(57) ABSTRACT

A technique for improving the quality of digital signals in a multi-level signaling system is disclosed. In one particular exemplary embodiment, the technique may be realized as a method for improving the quality of transmitted digital signals in a multi-level signaling system wherein digital signals representing more than one bit of information may be transmitted at more than two signal levels on a single transmission medium. The method may comprise encoding digital values represented by sets of N bits to provide corresponding sets of P symbols, wherein each set of P symbols is formed to reduce full-swing transitions between successive digital signal transmissions.

52 Claims, 43 Drawing Sheets

| Code | Coded block length (Q) | Total Number of inserted bits in codeword (L) | Code Rules | | | FSR/FSE | | Full Swing Reduction (FSR) or Full Swing Elimination (FSE) |
|---|---|---|---|---|---|---|---|---|
| | | | Position of the reference inserted bit in codeword (P) | Vector of distances between inserted bits within and between consecutive codewords | | Number of consecutive full swing transitions eliminated in each codeword (e) | Number of consecutive full swing transitions not eliminated in each codeword (ne) | |
| 1 | 4i | i | 2,4,...,Q-2,Q | D has i components, each of the i components has a value of 4 | | Q/2 | 0 | FSE |
| 2 | 4i | i-1 | 2,4,...,Q-2,Q | D has i-1 components, each of the i-2 components has a value of 4 and the other component has a value of 8 | | ((Q/2)-2) | 2 | FSR |
| 3 | 4i | i-2 | 2,4,...,Q-2,Q | D has i-2 components, each of the i-3 components has a value of 4 and the other component has a value of 12 | | ((Q/2)-4) | 4 | FSR |
| 4 | 2i+2 | 1 | 2,4,...,Q | D has 1 component with a value of Q | | 2 | (Q/2) - 2 | FSR |

For codes 1 - 4 above, the uncoded word length is N; N=Q-L; the code rate is N/Q; the value of the inserted bits may be one or zero; and i is 1,2,3,....; if there exists a d in $D_e$ that has a value greater than 4, then the code effect is FSR; if all the d's in $D_e$ have a value that is selected from the values of 2 and 4, then the code effect is FSE. Also, the logic values of inserted bits can be all 1's, all 0's, or any combination of 1's and 0's. When the decoded logic value of any of the inserted bits is the complement of its corresponding inserted logic value during encoding, an error condition is indicated.

Figure 28A

| | Code Rules | | | | FSR/FSE | |
|---|---|---|---|---|---|---|
| Code | Subblock length (B) | Total Number of inserted bits in codeword (L); L=L1+L2, where L1 is the number of bits inserted in the first subblock and L2 is the number of bits inserted in the second subblock | Position of the reference inserted bit in codeword (P) | Vector of distances between inserted bits within and between consecutive codewords | Number of consecutive full swing transitions eliminated in each codeword (e) | Number of consecutive full swing transitions not eliminated in each codeword (ne) | Full Swing Reduction (FSR) or Full Swing Elimination (FSE) |
| 4 | 4i+2 | L1=i+1; L2=i+1 | 2,4,...,2B-2, 2B | D has 2i+2 components, 2i of the components have a value of 4 and the other two components are consecutive, and have a sum of 4 | B | 0 | FSE |
| 5 | 4i+2 | L1=i; L2=i | 2,4,...,2B-2, 2B | D has 2i components, (2i-1) of the components have a value of 4 and the other component has a value of 8. | B-2 | 2 | FSR |
| 6 | 4i+2 | L1=i+1; L2=i | 2,6,...,2B-4,2B | D has 2i+1 components each having a value of 4. | B | 0 | FSE |
| 7 | 4i+2 | L1=i; L2=i+1 | 4,8,...2B-4,2B | D has 2i+1 components each having a value of 4. | B | 0 | FSE |

For codes 4 - 7 above, the length of the codeword is Q = 2B; the uncoded word length is N; N=Q-L; the code rate is N/Q; the value of the inserted bits may be one or zero; and i is 1,2,3,...; if there exists a d in $D_e$ that has a value greater than 4, then the code effect is FSR; if all the d's in $D_e$ have a value that is selected from the values of 2 and 4, then the code effect is FSE. Also, the logic values of inserted bits can be all 1's, all 0's, or any combination of 1's and 0's. When the decoded logic value of any of the inserted bits is the complement of its corresponding inserted logic value during encoding, an error condition is indicated.

Figure 28B

| Code | Sub-Block Length (B) | Total Number of inserted bits in codeword (L); L=L1+L2+L3+L4, where L1, L2, L3 and L4 are the respective number of bits inserted in the 1st, 2nd, 3rd and 4th subblocks | Position of reference inserted bit in codeword (P) | Code Rules - Vector of distances between inserted bits within and between consecutive codewords (D) | FSR/FSE - # of consecutive full swing transitions eliminated in each codeword (e) | FSR/FSE - # of consecutive full swing transitions not eliminated in each codeword (ne) | FSR or FSE |
|---|---|---|---|---|---|---|---|
| 8 | 4i+1 | L1=i; L2=i+1; L3=i; L4=i | 2 | D has 4i+1 components each having a value of 4 | 2B | 0 | FSE |
| 9 | 4i+1 | L1=i; L2=i; L3=i; L4=i+1 | 4 | D has 4i+1 components each having a value of 4 | 2B | 0 | FSE |
| 10 | 4i+1 | L1=i; L2=i; L3=i; L4=i | 2 or 4 | D has 4i components, (4i-1) of the components has a value of 4, the other component has a value of 8 | 2B-2 | 2 | FSR |
| 11 | 4i+1 | L1=i+1; L2=i+1; L3=i+1; L4=i+1 | 2 or 4 | D has 4i+4 components, (4i-2) of the components have a value of 4, the remaining 6 components comprise 3 pairs of components with each pair of components adding to 4. | 2B | 0 | FSE |
| 12 | 4i+3 | L1=i+1; L2=i+1; L3=i; L4=i+1 | 2 | D has 4i+3 components each having a value of 4 | 2B | 0 | FSE |
| 13 | 4i+3 | L1=i; L2=i+1; L3=i+1; L4=i+1 | 4 | D has 4i+3 components each having a value of 4 | 2B | 0 | FSE |
| 14 | 4i+3 | L1=i+1; L2=i+1; L3=i+1; L4=i+1 | 2 or 4 | D has 4i+4 components, (4i+2) of the components have a value of 4, the other two components sum to 4. | 2B | 0 | FSE |
| 15 | 4i+3 | L1=i+1; L2=i; L3=i; L4=i+1 or L1=i+1; L2=i+1; L3=i; L4=i | 2 or 4 | D has 4i+2 components, (4i+1) of the components have a value of 4, the other component has a value of 8. | 2B-2 | 2 | FSR |
| 16 | 4i+3 | L1=i; L2=i+1; L3=i+1; L4=i+1 | 2,4,6 or 8 | D has 4i+2 components, (4i+1) of the components have a value of 4, the other component has a value of 8. | 2B-2 | 2 | FSR |
| 17 | 4i+3 | L1=i+1; L2=i+1; L3=i-1; L4=i+1 | 2 or 4 | D has 4i+2 components, (4i+1) of the components have a value of 8 | 2B-2 | 2 | FSR |
| 18 | 4i+3 | L1=i-1; L2=i+1; L3=i+1; L4=i+1 | 2 or 4 | D has 4i+2 components, (4i+1) of the components have a value of 4 and the other component has a value of 8 | 2B-2 | 2 | FSR |
| 19 | 4i+3 | L1=i+1; L2=i; L3=i; L4=i or L1=i+1; L2=i+1; L3=i-1; L4=i or L1=i+1; L2=i; L3=i-1; L4=i+1 or L1=i+1; L2=i-1; L3=i; L4=i+1 or L1=i+1; L2=i+1; L3=i; L4=i-1 | 2 or 4 | D has 4i+1 components, (4i-1) of the components have a value of 4 and the other 2 components have a value of 8; or D has 4i+1 components, (4i) of the components have a value of 4 and the other component has a value of 12 | 2B-4 | 4 | FSR |

Figure 28C

| Code | Sub-Block Length (B) | Code Rules | | | FSR/FSE | | FSR or FSE |
|---|---|---|---|---|---|---|---|
| | | Total Number of inserted bits in codeword (L); L=L1+L2+L3+L4, where L1, L2, L3 and L4 are the respective number of bits inserted in the 1st, 2nd, 3rd and 4th subblocks | Position of reference inserted bit in codeword (P) | Vector of distances between inserted bits within and between consecutive codewords (D) | # of consecutive full swing transitions eliminated in each codeword (e) | # of consecutive full swing transitions not eliminated in each codeword (ne) | |
| 20 | 4i+3 | L1=i; L2=i+1; L3=i-1; L4=i+1 or L1=i; L2=i; L3=i; L4=i+1 or L1=i; L2=i+1; L3=i; L4=i | 2,4,6 or 8 | D has 4i+1 components, (4i-1) of the components have a value of 4 and the other two components has a value of 8; or D has 4i+1 components, (4i) of the components have a value of 4 and the other component has a value of 12 | 2B-4 | 4 | FSR |
| 21 | 4i+3 | L1=i-1; L2=i+1; L3=i; L4=i+1 | 2,4,6,8, 10 or 12 | D has 4i+1 components, (4i-1) of the components have a value of 4 and the other two components have a value of 8; or D has 4i+1 components, (4i) of the components have a value of 4 and the other component has a value of 12 | 2B-4 | 4 | FSR |
| 22 | 4i+3 | L1=i+1; L2=i; L3=i; L4=i-1 or L1=i+1; L2=i-1; L3=i; L4=i-1 | 2 or 4 | D has 4i components, (4i-2) of the components have a value of 4 and the other two components have values of 8 and 12 | 2B-6 | 6 | FSR |
| 23 | 4i+3 | L1=i; L2=i-1; L3=i; L4=i+1 or L1=i; L2=i+1; L3=i; L4=i+1 | 2,4,6 or 8 | D has 4i components, (4i-1) of the components has a value of 16; or D has 4i components, (4i-2) of the components have a value of 4 and the other two components have values of 8 and 12 | 2B-6 | 6 | FSR |
| 24 | 4i+3 | L1=i-1; L2=i; L3=i; L4=i+1 or L1=i-1; L2=i+1; L3=i; L4=i | 2,4,6,8, 10 or 12 | D has 4i components, (4i-1) of the components has a value of 16; or D has 4i components, (4i-2) of the components have a value of 4 and the other two components have values of 8 and 12 | 2B-6 | 6 | FSR |
| 25 | 4i+3 | L1=i+1; L2=i; L3=i-1; L4=i+1 or L1=i+1; L2=i+1; L3=i-1; L4=i-1 | 2 or 4 | D has 4i components, (4i-1) of the components have a value of 4 and the other component has a value of 16 | 2B-6 | 6 | FSR |
| 26 | 4i+3 | L1=i-1; L2=i+1; L3=i-1; L4=i+1 | 2,4,6,8, 10 or 12 | D has 4i components, (4i-2) of the components has a value of 8; or D has 4i components, (4i-2) of the components have values of 8 and 12 | 2B-6 | 6 | FSR |
| 27 | 4i+3 | L1=i; L2=i; L3=i; L4=i | 2,4,6 or 8 | D has 4i components, (4i-3) of the components have a value of 4 and the other three components has a value of 8; or D has 4i components, (4i-2) of the components have a value of 4 and the other two components have values of 8 and 12 | 2B-6 | 6 | FSR |

For codes 8-27 above, the length of the codeword is Q = 4B; the uncoded word length is N, N=Q-L, the code rate is N/Q; the value of the inserted bits may be one or zero; and i is 1,2,3,... if there exists a d in $D_e$ that has a value greater than 4, then the code effect is FSR; if all the d's in $D_e$ have a value that is selected from the values of 2 and 4, then the code effect is FSE. For ne > 2, the e (ne) does not necessarily correspond to the number of consecutive transitions eliminated (not-eliminated), but instead to the total number of transitions eliminated (not-eliminated) in general. Also, the logic values of inserted bits can be all 1's, all 0's, or any combination of 1's and 0's. When the decoded logic value of any of the inserted bits is the complement of its corresponding inserted logic value during encoding, an error condition is indicated.

Figure 28C (cont.)

| Code Type | Block length (Q) | Total Number of inserted bits in codeword (L) | Code Rules | | # of consecutive full swing transitions eliminated in each codeword (e) | FSR/FSE | |
|---|---|---|---|---|---|---|---|
| | | | Position of the reference inserted bit in codeword (P) | Vector of distances between inserted bits within and between consecutive codewords (D) | | # of consecutive full swing transitions not eliminated in each codeword (ne) | Full Swing Reduction (FSR) or Full Swing Elimination (FSE) |
| 4s5s | 10 | 2 | 2,4,...,10 | D has 2 components, one has a value of 4 and the other has a value of 6. | 4 | 1 | FSR |
| 5s6s | 12 | 2 | 2,4,...,12 | D has 2 components, one has a value of 4 and the other has a value of 8. | 4 | 2 | FSR |
| 5s6s | 12 | 2 | 2,4,...,12 | D has 2 components, and each has a value of 6. | 2 | 1 | FSR |
| 8s10s | 20 | 4 | 2,4,...,20 | D has 4 components, out of which two components have a value of 4 and the other two have a value of 6 | 4 | 1 | FSR |
| 9b10b | 10 | 1 | 2,4,...,10 | D has 1 component which has a value of 10 | 2 | 3 | FSR |
| 25b26b | 26 | 1 | 2,4,...,26 | D has 1 component which has a value of 10 | 2 | 11 | FSR |

For the above codes, the uncoded word length is N; N=Q-L; the code rate is N/Q; the value of the inserted bits may be one or zero; since there exists a d in $D_e$ that has a value greater than 4, the code effect is FSR. Also, the logic values of inserted bits can be all 1's, all 0's, or any combination of 1's and 0's. When the decoded logic value of any of the inserted bits is the complement of its corresponding inserted logic value during encoding, an error condition is indicated.

Figure 28D

| Uncoded Bit Pairs | LSB MSB $b_1$ $b_0$ | | Mapping to Symbols: $S^{(k-1)}$, $S^{(k)}$ | | | |
|---|---|---|---|---|---|---|
| Time (k-1) | Time (k) | | C-PAM 5.1 | | C-PAM 5.2 | |
| $b_1^{(k-1)}$  $b_0^{(k-1)}$ | $b_1^{(k)}$ | $b_0^{(k)}$ | $S^{(k-1)}$ | $S^{(k)}$ | $S^{(k-1)}$ | $S^{(k)}$ |
| 0  0 | 0 | 0 | 2a | 2a | 2a | 2a |
| 0  0 | 1 | 0 | 2a | a | 2a | a |
| 0  0 | 1 | 1 | 0 | -a | 0 | -a |
| 0  0 | 0 | 1 | 0 | a | 0 | a |
| 1  0 | 0 | 0 | a | 2a | a | 2a |
| 1  0 | 1 | 0 | a | a | a | a |
| 1  0 | 1 | 1 | a | -a | a | -a |
| 1  0 | 0 | 1 | 0 | 2a | 0 | 2a |
| 1  1 | 0 | 0 | -a | 0 | -a | 0 |
| 1  1 | 1 | 0 | -a | a | -a | a |
| 1  1 | 1 | 1 | -a | -a | -a | -a |
| 1  1 | 0 | 1 | -a | -2a | -a | -2a |
| 0  1 | 0 | 0 | a | 0 | a | 0 |
| 0  1 | 1 | 0 | 0 | 0 | 0 | -2a |
| 0  1 | 1 | 1 | -2a | -a | -2a | -a |
| 0  1 | 0 | 1 | -2a | -2a | -2a | -2a |

Figure 30

| Uncoded Bit Pairs | | | | C-PAM 5.1 | | | | C-PAM 5.2 | | | |
|---|---|---|---|---|---|---|---|---|---|---|---|
| | | | | Spare BW | | | | Spare BW | | | |
| Time (k-1) | | Time (k) | | Unused | | Used | | Unused | | Used | |
| $b_1^{(k-1)}$ | $b_0^{(k-1)}$ | $b_1^{(k)}$ | $b_0^{(k)}$ | $S^{(k-1)}$ | $S^{(k)}$ | $S^{(k-1)}$ | $S^{(k)}$ | $S^{(k-1)}$ | $S^{(k)}$ | $S^{(k-1)}$ | $S^{(k)}$ |
| 0 | 0 | 0 | 0 | 2a | 2a | 2a | 2a | 2a | 2a | 2a | 2a |
| 0 | 0 | 1 | 0 | 2a | a | 2a | a | 2a | a | 2a | a |
| 0 | 0 | 1 | 1 | 0 | -a | 0 | -a | 0 | -a | 0 | -a |
| 0 | 0 | 0 | 1 | 0 | a | 0 | a | 0 | a | 0 | a |
| 1 | 0 | 0 | 0 | a | 2a | a | 2a | a | 2a | a | 2a |
| 1 | 0 | 1 | 0 | a | a | a | a | a | a | a | a |
| 1 | 0 | 1 | 1 | a | -a | 0 | -2a | a | -a | 2a | 0 |
| 1 | 0 | 0 | 1 | 0 | 2a | 2a | 0 | 0 | 2a | 0 | 0 |
| 1 | 1 | 0 | 0 | -a | 0 | -a | 0 | -a | 0 | -a | 0 |
| 1 | 1 | 1 | 0 | -a | a | -2a | 0 | -a | a | -2a | 0 |
| 1 | 1 | 1 | 1 | -a | -a | -a | -a | -a | -a | -a | -a |
| 1 | 1 | 0 | 1 | -a | -2a | -a | -2a | -a | -2a | -a | -2a |
| 0 | 1 | 0 | 0 | a | 0 | a | 0 | a | 0 | a | 0 |
| 0 | 1 | 1 | 0 | 0 | 0 | 0 | 0 | 0 | -2a | 0 | -2a |
| 0 | 1 | 1 | 1 | -2a | -a | -2a | -a | -2a | -a | -2a | -a |
| 0 | 1 | 0 | 1 | -2a | -2a | -2a | -2a | -2a | -2a | -2a | -2a |

Figure 32

| Spare BW ||||
|---|---|---|---|
| C-PAM 5.1 || C-PAM 5.2 ||
| $S^{(k-1)}$ | $S^{(k)}$ | $S^{(k-1)}$ | $S^{(k)}$ |
| 0 | -2a | -2a | 0 |
| -2a | 0 | 2a | 0 |
| 2a | 0 | 0 | 0 |

Figure 33

| Error Detection | | | |
|---|---|---|---|
| C-PAM 5.1 | | C-PAM 5.2 | |
| $S^{(k-1)}$ | $S^{(k)}$ | $S^{(k-1)}$ | $S^{(k)}$ |
| 2a | -2a | 2a | -2a |
| -2a | 2a | -2a | 2a |
| 2a | -a | 2a | -a |
| -a | 2a | -a | 2a |
| -2a | a | -2a | a |
| a | -2a | a | -2a |
| 0 | -2a | -2a | 0 |
| -2a | 0 | 2a | 0 |
| 2a | 0 | 0 | 0 |

Rows 1–6: error detection and Spare BW is used

Rows 7–9 (C-PAM 5.2): Spare BW is not used, ONLY error detection

Figure 34

| C-PAM 5.3 Mapping Table ||||
|---|---|---|---|
| From: || To: ||
| $S^{(k)}$ | $S^{(k+1)}$ | $S^{(k)}$ | $S^{(k+1)}$ |
| -2a | a | 0 | a |
| 2a | -2a | 0 | -2a |
| -2a | 2a | 0 | 2a |
| 2a | -a | 0 | -a |

Figure 35

| 3 Uncoded Bit Pairs | | LSB $b_1$ | MSB $b_0$ | | | C-PAM 5.3 | | |
|---|---|---|---|---|---|---|---|---|
| $b_1^{(k-1)}$ | $b_0^{(k-1)}$ | $b_1^{(k)}$ | $b_0^{(k)}$ | $b_1^{(k+1)}$ | $b_0^{(k+1)}$ | $S^{(k-1)}$ | $S^{(k)}$ | $S^{(k+1)}$ |
| 0 | 0 | 0 | 0 | 0 | 0 | 2a | 2a | 2a |
| 0 | 0 | 0 | 0 | 0 | 1 | 2a | 2a | a |
| 0 | 0 | 0 | 0 | 1 | 0 | 2a | 0 | -2a |
| 0 | 0 | 0 | 0 | 1 | 1 | 2a | 0 | -a |
| 0 | 0 | 0 | 1 | 0 | 0 | 2a | a | 2a |
| 0 | 0 | 0 | 1 | 0 | 1 | 2a | a | a |
| 0 | 0 | 0 | 1 | 1 | 0 | 2a | a | -2a |
| 0 | 0 | 0 | 1 | 1 | 1 | 2a | a | -a |
| 0 | 0 | 1 | 0 | 0 | 0 | 0 | 0 | 2a |
| 0 | 0 | 1 | 0 | 0 | 1 | 0 | 0 | a |
| 0 | 0 | 1 | 0 | 1 | 0 | 0 | -2a | -2a |
| 0 | 0 | 1 | 0 | 1 | 1 | 0 | -2a | -a |
| 0 | 0 | 1 | 1 | 0 | 0 | 0 | -a | 2a |
| 0 | 0 | 1 | 1 | 0 | 1 | 0 | -a | a |
| 0 | 0 | 1 | 1 | 1 | 0 | 0 | -a | -2a |
| 0 | 0 | 1 | 1 | 1 | 1 | 0 | -a | -a |
| 0 | 1 | 0 | 0 | 0 | 0 | a | 2a | 2a |
| 0 | 1 | 0 | 0 | 0 | 1 | a | 2a | a |
| 0 | 1 | 0 | 0 | 1 | 0 | a | 0 | -2a |
| 0 | 1 | 0 | 0 | 1 | 1 | a | 0 | -a |
| 0 | 1 | 0 | 1 | 0 | 0 | a | a | 2a |
| 0 | 1 | 0 | 1 | 0 | 1 | a | a | a |
| 0 | 1 | 0 | 1 | 1 | 0 | a | a | -2a |
| 0 | 1 | 0 | 1 | 1 | 1 | a | a | -a |
| 0 | 1 | 1 | 0 | 0 | 0 | a | 0 | 2a |
| 0 | 1 | 1 | 0 | 0 | 1 | a | 0 | a |
| 0 | 1 | 1 | 0 | 1 | 0 | a | -2a | -2a |
| 0 | 1 | 1 | 0 | 1 | 1 | a | -2a | -a |
| 0 | 1 | 1 | 1 | 0 | 0 | a | -a | 2a |
| 0 | 1 | 1 | 1 | 0 | 1 | a | -a | a |
| 0 | 1 | 1 | 1 | 1 | 0 | a | -a | -2a |
| 0 | 1 | 1 | 1 | 1 | 1 | a | -a | -a |

Figure 36A

| 3 Uncoded Bit Pairs | | | LSB $b_1$ | MSB $b_0$ | | C-PAM 5.3 | | |
|---|---|---|---|---|---|---|---|---|
| $b_1^{(k-1)}$ | $b_0^{(k-1)}$ | $b_1^{(k)}$ | $b_0^{(k)}$ | $b_1^{(k+1)}$ | $b_0^{(k+1)}$ | $S^{(k-1)}$ | $S^{(k)}$ | $S^{(k+1)}$ |
| 1 | 0 | 0 | 0 | 0 | 0 | 0 | 2a | 2a |
| 1 | 0 | 0 | 0 | 0 | 1 | 0 | 2a | a |
| 1 | 0 | 0 | 0 | 1 | 0 | 0 | 0 | -2a |
| 1 | 0 | 0 | 0 | 1 | 1 | 0 | 0 | -a |
| 1 | 0 | 0 | 1 | 0 | 0 | 0 | a | 2a |
| 1 | 0 | 0 | 1 | 0 | 1 | 0 | a | a |
| 1 | 0 | 0 | 1 | 1 | 0 | 0 | a | -2a |
| 1 | 0 | 0 | 1 | 1 | 1 | 0 | a | -a |
| 1 | 0 | 1 | 0 | 0 | 0 | -2a | 0 | 2a |
| 1 | 0 | 1 | 0 | 0 | 1 | -2a | 0 | a |
| 1 | 0 | 1 | 0 | 1 | 0 | -2a | -2a | -2a |
| 1 | 0 | 1 | 0 | 1 | 1 | -2a | -2a | -a |
| 1 | 0 | 1 | 1 | 0 | 0 | -2a | -a | 2a |
| 1 | 0 | 1 | 1 | 0 | 1 | -2a | -a | a |
| 1 | 0 | 1 | 1 | 1 | 0 | -2a | -a | -2a |
| 1 | 0 | 1 | 1 | 1 | 1 | -2a | -a | -a |
| 1 | 1 | 0 | 0 | 0 | 0 | -a | 2a | 2a |
| 1 | 1 | 0 | 0 | 0 | 1 | -a | 2a | a |
| 1 | 1 | 0 | 0 | 1 | 0 | -a | 0 | -2a |
| 1 | 1 | 0 | 0 | 1 | 1 | -a | 0 | -a |
| 1 | 1 | 0 | 1 | 0 | 0 | -a | a | 2a |
| 1 | 1 | 0 | 1 | 0 | 1 | -a | a | a |
| 1 | 1 | 0 | 1 | 1 | 0 | -a | a | -2a |
| 1 | 1 | 0 | 1 | 1 | 1 | -a | a | -a |
| 1 | 1 | 1 | 0 | 0 | 0 | -a | 0 | 2a |
| 1 | 1 | 1 | 0 | 0 | 1 | -a | 0 | a |
| 1 | 1 | 1 | 0 | 1 | 0 | -a | -2a | -2a |
| 1 | 1 | 1 | 0 | 1 | 1 | -a | -2a | -a |
| 1 | 1 | 1 | 1 | 0 | 0 | -a | -a | 2a |
| 1 | 1 | 1 | 1 | 0 | 1 | -a | -a | a |
| 1 | 1 | 1 | 1 | 1 | 0 | -a | -a | -2a |
| 1 | 1 | 1 | 1 | 1 | 1 | -a | -a | -a |

Figure 36B

TECHNIQUE FOR IMPROVING THE QUALITY OF DIGITAL SIGNALS IN A MULTI-LEVEL SIGNALING SYSTEM

FIELD OF THE INVENTION

The present invention relates generally to multi-level signaling and, more particularly, to a technique for improving the quality of digital signals in a multi-level signaling system.

BACKGROUND OF THE INVENTION

High-speed serial link channels delivering an effective data rate above 5 Gb/s in a backplane environment are subject to significant signal distortion due to inter-symbol interference (ISI). Transmitters and receivers need to compensate for most of the signal distortion using very low complexity schemes in order to obtain a target bit error rate (BER) of less than or equal to $10^{-17}$ at Gb/s rates and under severe power and complexity restrictions. This constrained space presents significant challenges to well-known signal processing and coding techniques, and sub-optimal but efficient alternatives are sometimes needed to fulfill the task.

Attenuation caused by conductor and dielectric losses causes dispersion ISI. Another important ISI component is reflections, which are essentially multipath components of a signal and originate from impedance discontinuities such as those caused by connectors of line cards at both transmit and receive ends. In addition to ISI distortion, cross-talk effects from far and near end adjacent channels is becoming increasingly significant.

To counteract channel attenuation at high bit rates, conventional 2-level pulse amplitude modulation (2-PAM) signaling may be replaced by other multi-level signaling schemes that utilize more than two signal levels. That is, in a 2-PAM signaling system, each conductor in the system may carry signals at one of two signal levels (i.e., at either a logic zero level or a logic one level). Thus, in a 2-PAM signaling system, each conductor in the system can only transmit one bit of data at a time. However, in a 4-level pulse amplitude modulation (4-PAM) signaling system, for example, each conductor in the system may carry signals at four different signal levels (i.e., four different symbols). Thus, in a 4-PAM signaling system, each conductor in the system can transmit two bits of data simultaneously at one half the symbol rate for an equivalent bandwidth.

While advantageous in channels with dominant attenuation, signaling systems that utilize more than two signal levels are more sensitive to reflections and cross-talk than 2-PAM signaling systems due to the reduction in signal margin as a result of carrying more information per symbol. Thus, in cases where high loss and reflections are combined, the advantages of signaling systems that utilize more than two signal levels over 2-PAM signaling systems may be lost.

In order to preserve the advantages of signaling systems that utilize more than two signal levels over 2-PAM signaling systems, it would be desirable to reduce the number of full-swing transitions (FST) between sequential symbols. Reducing the number of FST between sequential symbols enhances system performance in terms of: 1.) voltage margins (Vm), by reducing peak distortion (PD) via the elimination of one or more worst case sequences; and 2.) timing margins (Tm), especially at outer eyes where FST close eyes the most.

It would also be desirable to secure a minimum density of desirable symbol transitions useful for clock recovery. These clock data recovery (CDR) transitions could prevent continuous phase drifting from an optimum sampling point at the center of an eye in plesiochronous systems with frequency offsets between received data and a local receive clock.

In view of the foregoing, it would be desirable to provide a technique for improving the quality of digital signals in a multi-level signaling system which overcomes the above-described inadequacies and shortcomings in an efficient and cost effective manner.

SUMMARY OF THE INVENTION

According to the present invention, a technique for improving the quality of digital signals in a multi-level signaling system is provided. In one particular exemplary embodiment, the technique may be realized as a method for improving the quality of transmitted digital signals in a multi-level signaling system wherein digital signals representing more than one bit of information may be transmitted at more than two signal levels on a single transmission medium. The method may comprise encoding digital values represented by sets of N bits to provide corresponding sets of P symbols, wherein each set of P symbols is formed to reduce full-swing transitions between successive digital signal transmissions.

In accordance with other aspects of this particular exemplary embodiment of the present invention, each set of P symbols may beneficially be formed with Q bits, wherein Q is greater than N. For example, Q and N may beneficially have the values of N=B and Q=10, N=10 and Q=12, N=16 and Q=20, N=9 and Q=10, and N=25 and Q=26.

In accordance with further aspects of this particular exemplary embodiment of the present invention, digital signals may beneficially be transmitted at multiple different signals levels. For example, digital signals may be transmitted at four signal levels on a single transmission medium or digital signals may be transmitted at five signal levels on a single transmission medium.

In accordance with additional aspects of this particular exemplary embodiment of the present invention, the single transmission medium may beneficially be realized in one of many possible embodiments. For example, the single transmission medium may comprise a single electrical conductor, a differential pair of electrical conductors, or an optical fiber.

In accordance with still other aspects of this particular exemplary embodiment of the present invention, each symbol may beneficially represent two bits, and each set of P symbols may beneficially include at least one transition that is substantially geometrically centered, wherein a particular symbol in each set of P symbols may beneficially be formed to ensure that undesirable transitions do not occur between neighboring sets of P symbols.

In accordance with still further aspects of this particular exemplary embodiment of the present invention, the digital values may beneficially be encoded by adding at least one bit having a fixed bit value to the N bits to generate each set of P symbols. Also, the digital values may beneficially be encoded by. adding a parity bit to the N bits, and then substituting at least one bit having a fixed bit value for at least one of the N bits to generate each set of P symbols. Alternatively, the digital values may beneficially be encoded by forming pairs of symbols in each set of P symbols based upon the value of corresponding pairs of bits in the N bits.

In accordance with still additional aspects of this particular exemplary embodiment of the present invention, the method may further beneficially comprise transmitting the sets of P symbols., receiving the transmitted sets of P symbols, and then decoding the digital values represented by the sets of N bits from the transmitted sets of P symbols.

In accordance with still other aspects of this particular exemplary embodiment of the present invention, each set of P symbols may beneficially be formed to eliminate full-swing transitions between at least every other successive digital signal transmission. Alternatively, each set of P symbols may beneficially be formed to eliminate non-full-swing transitions between at least every other successive digital signal transmission.

In another particular exemplary embodiment, the technique may be realized as an apparatus for improving the quality of transmitted digital signals in a multi-level signaling system wherein digital signals representing more than one bit of information may be transmitted at more than two signal levels on a single transmission medium. The apparatus may comprise an encoder that encodes digital values represented by sets of N bits to provide corresponding sets of P symbols, wherein each set of P symbols is formed to reduce full-swing transitions between successive digital signal transmissions.

In accordance with other aspects of this particular exemplary embodiment of the present invention, the apparatus may further beneficially comprise a transmitter that transmits the sets of P symbols, a receiver that receives the transmitted sets of P symbols, and a decoder that decodes the digital values represented by the sets of N bits from the transmitted sets of P symbols.

In accordance with further aspects of this particular exemplary embodiment of the present invention, the apparatus may beneficially comprise additional features similar to those recited above with respect to the above-described method.

In another particular exemplary embodiment, the technique may be realized as another method for improving the quality of transmitted digital signals in a multi-level signaling system wherein digital signals representing more than one bit of information may be transmitted at more than two signal levels on a single transmission medium. The method may comprise encoding digital values represented by sets of N bits to provide corresponding sets of P symbols, wherein each set of P symbols being formed to reduce non-full-swing transitions between successive digital signal transmissions.

In accordance with other aspects of this particular exemplary embodiment of the present invention, each set of P symbols may beneficially be also formed to eliminate full-swing transitions between successive digital signal transmissions.

In accordance with further aspects of this particular exemplary embodiment of the present invention, the digital values may beneficially be encoded by forming each symbol in each set of P symbols based upon the value of a corresponding pair of bits in the N bits. Also, the digital values may beneficially be encoded by forming each symbol in each set of P symbols based upon the value of at least subsequently encoded pair of bits.

In another particular exemplary embodiment, the technique may be realized as another apparatus for improving the quality of transmitted digital signals in a multi-level signaling system wherein digital signals representing more than one bit of information may be transmitted at more than two signal levels on a single transmission medium. The apparatus may comprise an encoder that encodes digital values represented by sets of N bits to provide corresponding sets of P symbols, wherein each set of P symbols is formed to reduce non-full-swing transitions between successive digital signal transmissions.

In accordance with further aspects of this particular exemplary embodiment of the present invention, the apparatus may beneficially comprise additional features similar to those recited above with respect to the immediately above-described method.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 28A contains a table listing a series of transition-limiting codes.

FIG. 28B contains a table listing another series of transition-limiting codes.

FIG. 28C contains a table listing another series of transition-limiting codes.

FIG. 28D contains a table listing examples of transition-limiting codes.

FIG. 30 shows a table containing mappings from uncoded bit pairs to coded symbols for two different 5-PAM transition limiting codes (i.e., C-PAM5.1 and C-PAM5.2) in accordance with the present invention.

FIG. 32 shows a table containing mappings from uncoded bit pairs to coded symbols for two different 5-PAM transition limiting codes (i.e., C-PAM5.1 and C-PAM5.2) when both utilizing and not utilizing unused symbol transitions as spare bandwidth in accordance with the present invention.

FIG. 33 shows a table containing only the specific cases wherein two different 5-PAM transition limiting codes (i.e., CPAM5.1 and C-PAM5.2) utilize unused symbol transitions as spare bandwidth in accordance with the present invention.

FIG. 34 shows a table containing only the specific cases wherein two different 5-PAM transition limiting codes (i.e., CPAM5.1 and C-PAM5.2) utilize unused symbol transitions for error detection, as well as spare bandwidth in accordance with the present invention.

FIG. 35 shows a table containing one possible mapping from uncoded symbols into coded symbols for eliminating the largest transition and the second largest transition in consecutive symbol pairs in the 5-PAM signaling system of FIG. in accordance with the present invention.

FIGS. 36A and 36B shows tables containing mappings from uncoded bit pairs to coded symbols for an alternative 5-PAM transition limiting code (i.e., C-PAM5.3) in accordance with the present invention.

DETAILED DESCRIPTION OF EXEMPLARY EMBODIMENT(S)

Figure 1:
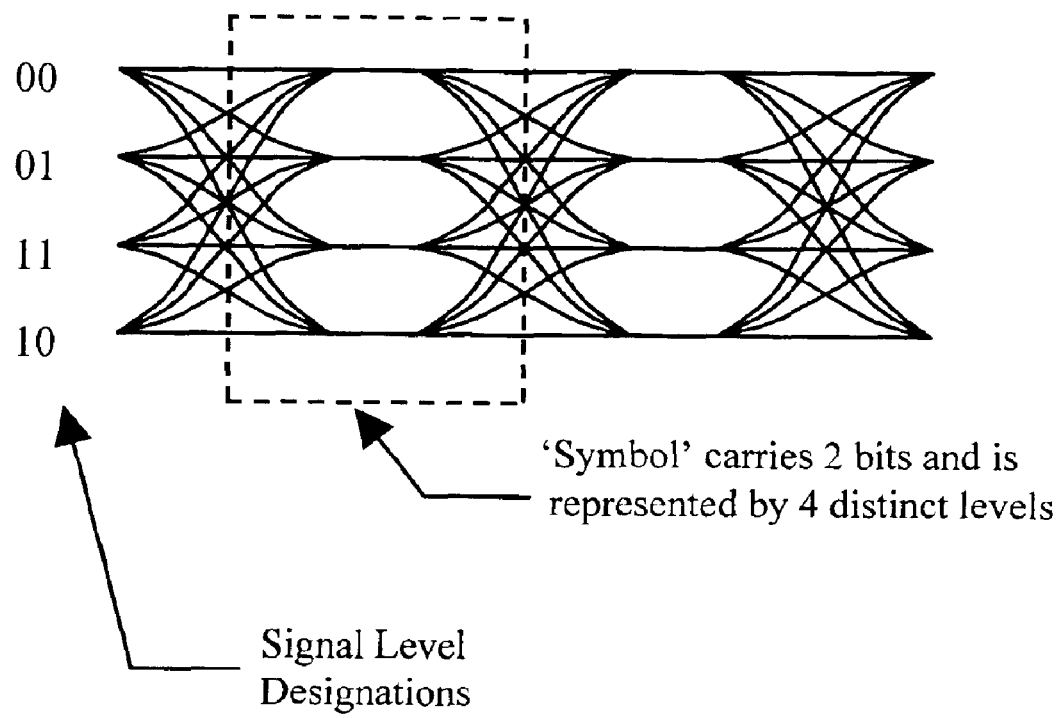
FIG. 1 shows a complete transition diagram for a 4-PAM signaling system.

Referring to FIG. 1, there is shown a complete transition diagram for a 4-PAM signaling system. This diagram shows all of the possibilities of how a signal at a given signal level may transition to another signal level between adjacent symbols. There are 16 distinct transitions between adjacent symbols, including transitions wherein there is no change in signal level between adjacent symbols.

Figure 2:
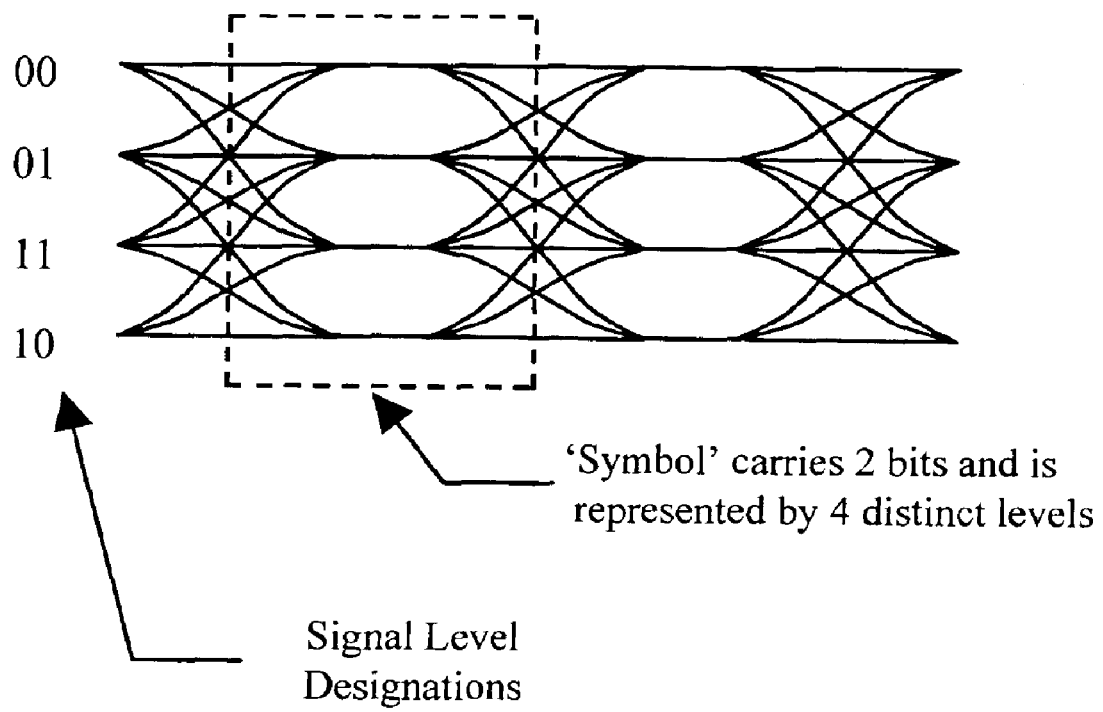
FIG. 2 shows a reduced transition diagram for a 4-PAM signaling system wherein full-swing transitions (FST) have been eliminated.

Referring to FIG. 2, there is shown a reduced transition diagram for a 4-PAM signaling system wherein full-swing transitions (FST) have been eliminated. There are now 14 distinct transitions between adjacent symbols, including transitions wherein there is no change in signal level between adjacent symbols.

The signal level designations shown in FIGS. 1 and 2 are such that a two-bit binary value is assigned to each signal level using a Gray code assignment. Each sequential symbol carries this two-bit binary value in a 4-PAM signaling system. It should be noted, however, that the present invention is not limited to signal level designations having Gray code assignments or to 4-PAM signaling systems.

Figure 3:
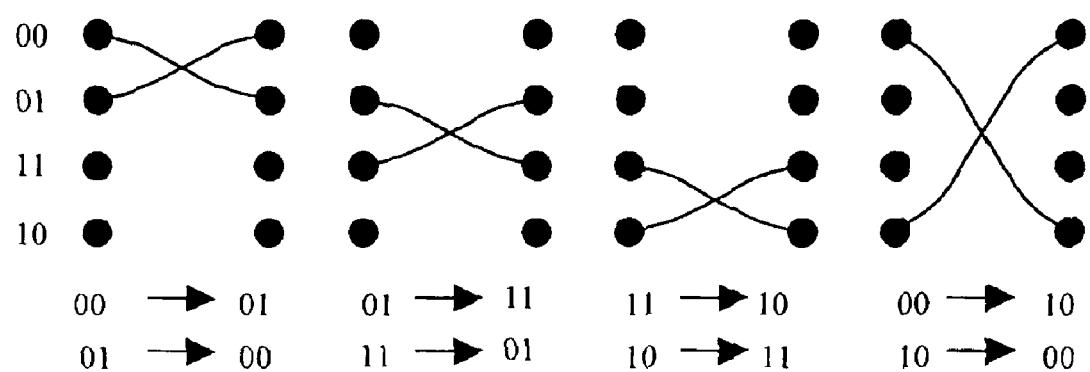
FIG. 3 shows a first group of symbol transitions which are desirable for use in clock recovery in a 4-PAM signaling system.

Referring to FIG. 3, there is shown a first group of symbol transitions which are desirable for use in clock recovery in a 4-PAM signaling system. These symbol transitions are desirable because the crossing point of each of the waveforms is geometrically centered between symbols. Each of these symbol transitions has a property wherein only the most significant bit (MSB) or the least significant bit (LSB) changes from one symbol to the next. This holds true for at least the numeric assignment given to each signal level used in this detailed description. The large MSB symbol transitions may be reduced via full-swing reduction (FSR) coding. Among the remaining six symbol transitions, the small MSB symbol transitions are the most desirable since there is no need to estimate an offset for samplers. Providing an adequate quantity of transitions suitable for clock recovery is a secondary objective of the coding techniques described herein.

Figure 4:
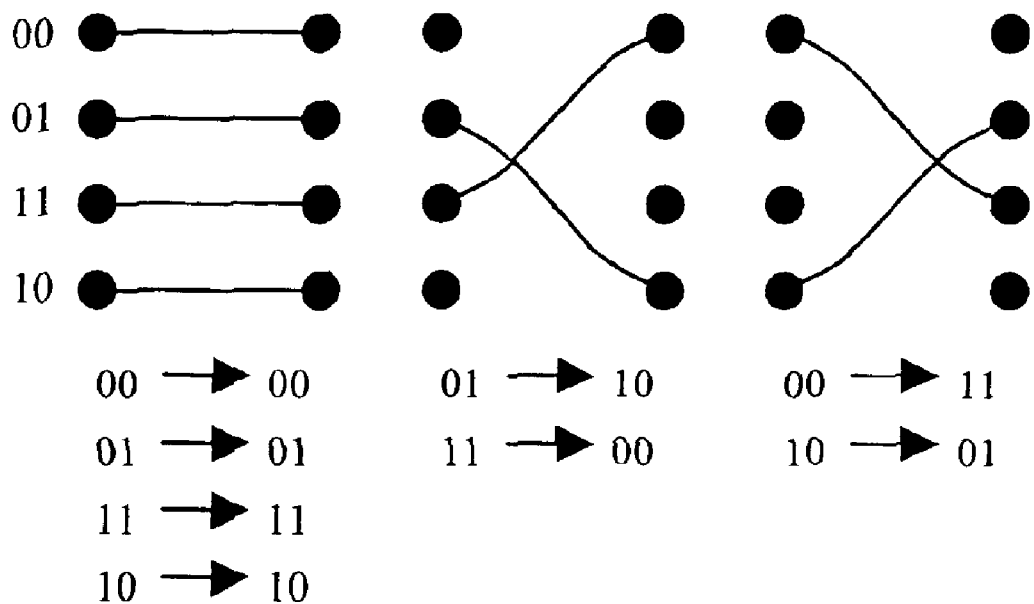
FIG. 4 shows a second group of symbol transitions which are not desirable for use in clock recovery in a 4-PAM signaling system.

Referring to FIG. 4, there is shown a second group of symbol transitions which are not desirable for use in clock recovery in a 4-PAM signaling system. The four symbol transitions having no value change cannot be used for clock recovery at all. The remaining four symbol transitions are not desirable because the crossing point of each of the waveforms is offset to either side of the geometric center between symbols. Clock recovery using these symbol transitions would pull the optimal sampling point away from the geometric center, potentially in a data dependent manner.

Figure 5:
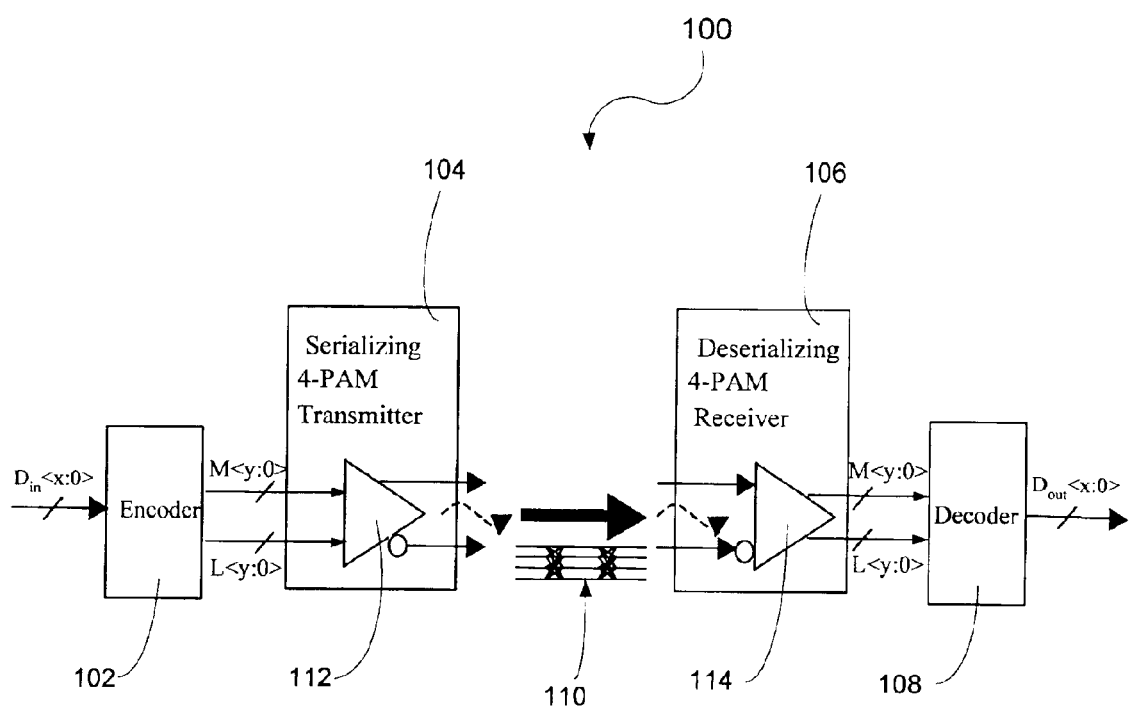
FIG. 5 shows a 4-PAM signaling system for supporting a technique for improving the quality of digital signals in a multi-level signaling system in accordance with the present invention.

Referring to FIG. 5, there is shown a 4-PAM signaling system 100 comprising an encoder 102, a serializing 4-PAM transmitter 104, a deserializing 4-PAM receiver 106, and a decoder 108. The serializing 4-PAM transmitter 104 and the deserializing 4-PAM receiver 106 are interconnected by a pair of signal carrying conductors 110.

The encoder 102 receives parallel input data $D_{in}$, and then encodes the received parallel input data Din so as to provide parallel codewords to the serializing 4-PAM transmitter 104 that are organized as MSB codewords (M) and LSB codewords (L). The MSB codewords (M) and the LSB codewords (L) together form multiple consecutive symbols. That is, each symbol is formed from a concatenation of an MSB codeword bit (i.e., M<m>) and an LSB codeword bit (i.e., L<n>), thereby forming a bit pair {M<m>, L<n>}. The parallel input data $D_{in}$ is received as a word having x+1 bits. The MSB codewords (M) and the LSB codewords (L) each have y+1 bits. The encoder 102 may be implemented with traditional binary logic.

The serializing 4-PAM transmitter 104 receives the MSB codewords (M) and the LSB codewords (L) in parallel form from the encoder 102. The serializing 4-PAM transmitter 104 comprises a differential transmitter 112 for differentially serially transmitting the received multiple consecutive symbols in the MSB codewords (M) and the LSB codewords (L) over the pair of signal carrying conductors 110 to the deserializing 4-PAM receiver 106.

The deserializing 4-PAM receiver 106 comprises a differential receiver 114 for differentially serially receiving the multiple consecutive symbols in the MSB codewords (M) and the LSB codewords (L) over the pair of signal carrying conductors 110 from the serializing 4-PAM transmitter 104. The differential receiver 114 then transmits the MSB codewords (M) and the LSB codewords (L) in parallel form to the decoder 108.

The decoder 108 is essentially the inverse of the encoder 102. That is, the decoder 108 receives the MSB codewords (M) and the LSB codewords (L) in parallel form from the deserializing 4-PAM receiver 106, and then decodes the received MSB codewords (M) and the received LSB codewords (L) so as to provide parallel output data $D_{out}$. The parallel output data $D_{out}$ is provided as a word having x+1 bits. The decoder 108 may be implemented with traditional binary logic.

At this point it should be noted that, while FIG. 5 shows the serializing 4-PAM transmitter 104 as having the differential transmitter 112 and the deserializing 4-PAM receiver 106 as having the differential receiver 114, the present invention is not limited in this regard. That is, the MSB codewords (M) and the LSB codewords (L) may be transmitted from the serializing 4-PAM transmitter 104 to the deserializing 4-PAM receiver 106 in a single-ended manner requiring only a single-ended transmitter and a single-ended receiver. Thus, the serializing 4-PAM transmitter 104 and the deserializing 4-PAM receiver 106 may alternatively be interconnected by a single signal carrying conductor instead of the pair of signal carrying conductors 110. Alternatively still, in an optical based system, the serializing 4-PAM transmitter 104 and the deserializing 4-PAM receiver 106 may be interconnected by an optical fiber capable carrying signals at multiple optical signal levels.

Most of the embodiments described hereinafter are directed primarily toward the encoder 102 and the decoder 108. These two components work in conjunction with the serializing 4-PAM transmitter 104 and the deserializing 4-PAM receiver 106 to provide desirable signal transmission characteristics and/or improve the signal to noise ratio for a given data rate.

Figure 6:
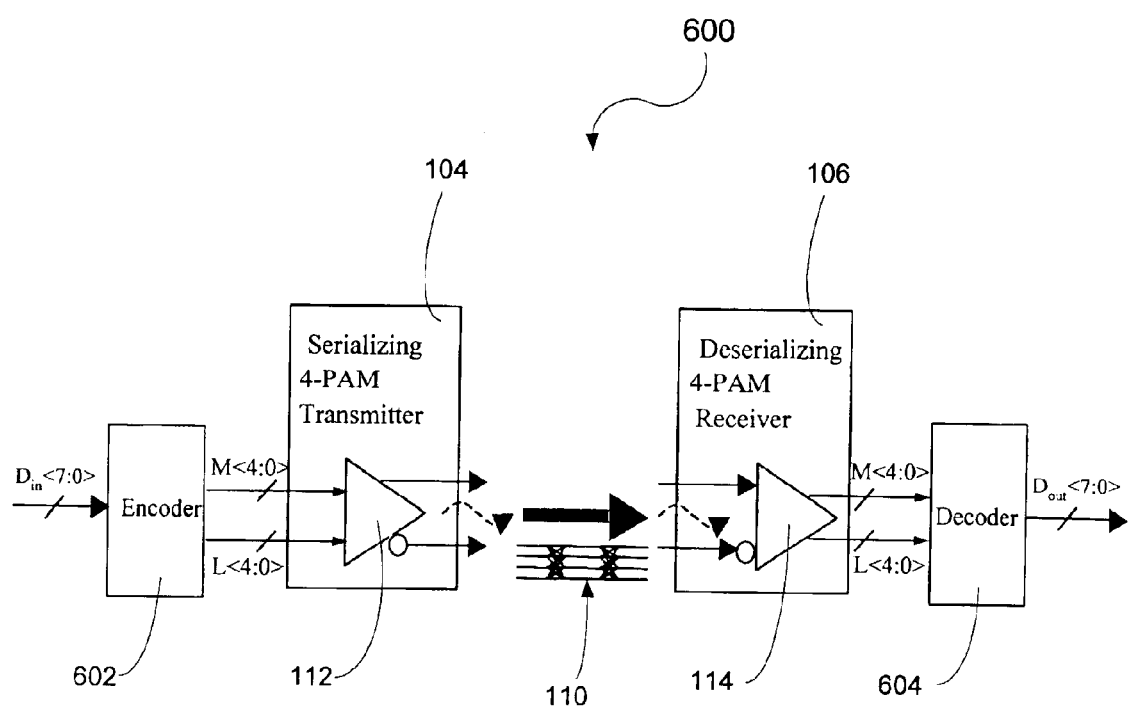
FIG. 6 shows the 4-PAM signaling system of FIG. 5 configured for implementing a 4S5S transition-limiting code in accordance with an embodiment of the present invention.

Referring to FIG. 6, there is shown a 4-PAM signaling system 600 configured for implementing a 4S5S transition-limiting code in accordance with an embodiment of the present invention. The system 600 of FIG. 6 is similar to the system 100 of FIG. 5, except that the system 600 of FIG. 6 specifically comprises a 4-symbol to 5-symbol (4S5S) encoder 602 and a 4-symbol from 5-symbol (4S5S) decoder 604 (i.e., a 4S5S codec implementation). The 4S5S transition-limiting code utilized in the 4-PAM signaling system 600 provides a modified 4-PAM sequence having a reduced number of full-swing transitions.

Similar to FIG. 5, the 4S5S encoder 602 shown in FIG. 6 receives parallel input data $D_{in}$<7:0>, and then encodes the received parallel input data $D_{in}$<7:0> so as to provide parallel codewords to the serializing 4-PAM transmitter 104 that are organized as MSB codewords (M<4:0>) and LSB codewords (L<4:0>). The MSB codewords (M<4:0>) and the LSB codewords (L<4:0>) together form multiple consecutive symbols. That is, each symbol is formed from a concatenation of an MSB codeword bit (e.g., M<2>) and an LSB codeword bit (e.g., L<2>), thereby forming a bit pair (e.g., {M<2>, L<2>}). The parallel input data $D_{in}$<7:0>is received as an 8-bit word. The MSB codewords (M<4:0>) and the LSB codewords (L<4:0>) each have 5 bits.

Also similar to FIG. 5, the 4S5S decoder 604 shown in FIG. 6 receives the MSB codewords (M<4:0>) and the LSB codewords (L<4:0>) in parallel form from the deserializing 4-PAM receiver 106, and then decodes the received MSB codewords (M<4:0>) and the received LSB codewords (L<4:0>) so as to provide parallel output data $D_{out}$<7:0>. The received MSB codewords (M<4:0>) and the received LSB codewords (L<4:0>) each have 5 bits. The parallel output data $D_{out}$<7:0> is provided as an 8-bit word.

Figure 7:
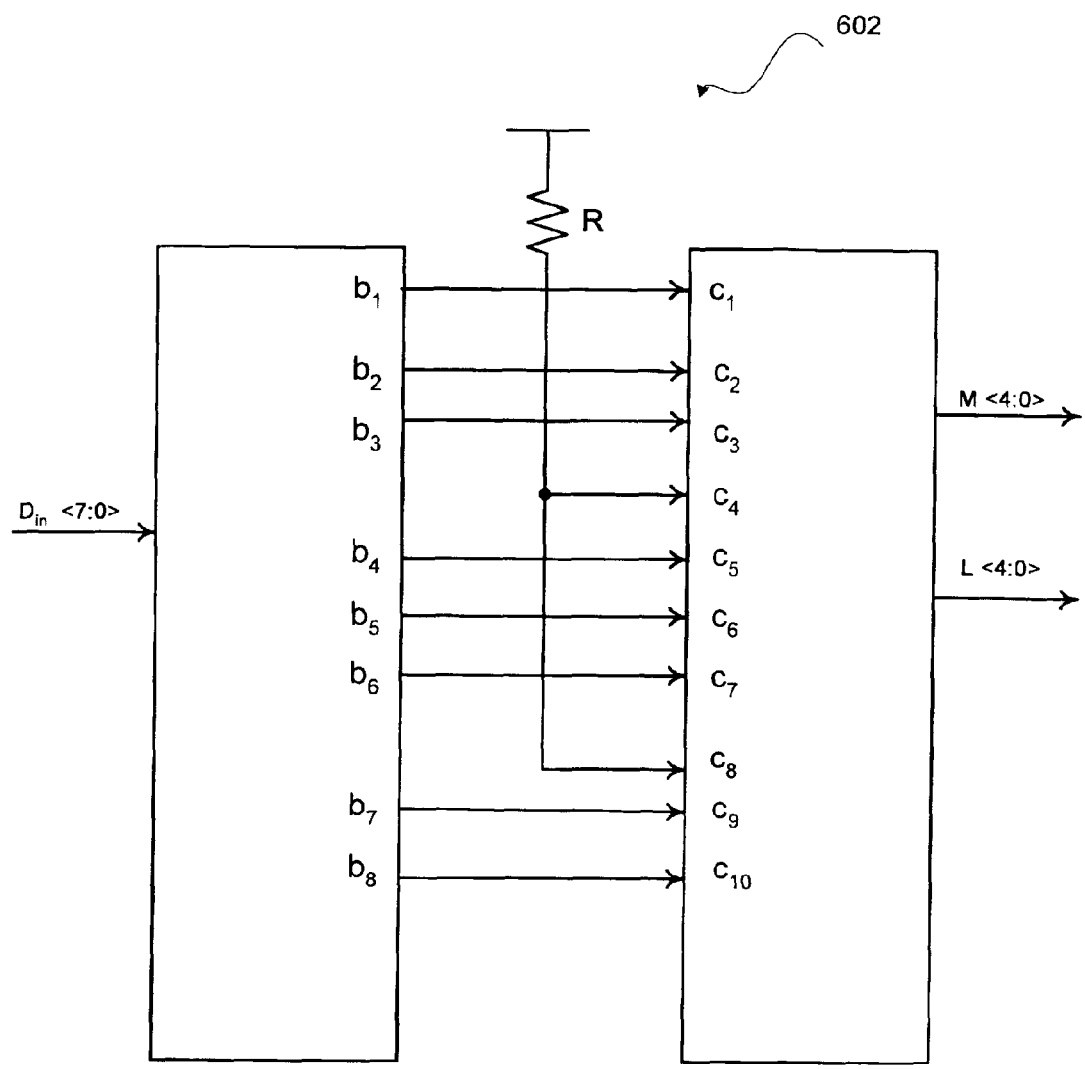
FIG. 7 shows a more detailed view of the 4S5S encoder shown in FIG. 6.

Referring to FIG. 7, there is shown a more detailed view of the 4S5S encoder 602 of FIG. 6. As shown in FIG. 7, the 4S5S encoder 602 receives parallel input data $D_{in}$<7:0> as an uncoded 8-bit word (i.e., $b_1, b_2, b_3, b_4, b_5, b_6, b_7, b_8$). The 4S5S encoder 602 inserts logic "1" values after the $3^{rd}$ (i.e., $b_3$) and the $6^{th}$ (i.e., $b_6$) uncoded bits so as to create a 10-bit codeword (i.e., $c_1, c_2, c_3, c_4, c_5, c_6, c_7, c_8, c_9, c_{10}$). The 10-bit codeword is then organized as an MSB codeword (M<4:0>) containing 5 codeword bits (i.e., $c_1, c_3, c_5, c_7, c_9$) and an LSB codeword (L<4:0>) containing 5 codeword bits (i.e., $c_2, c_4, c_6, c_8, c_{10}$). As described above, the MSB codeword (M<4:0>) and the LSB codeword (L<4:0>) are then provided to the serializing 4-PAM transmitter 104.

At this point it should be noted that alternate 4S5S encoders may insert logic values after other ones of the uncoded bits so as to create 10-bit codewords (i.e., $c_1, c_2, c_3, c_4, c_5, c_6, c_7, c_8, c_9, c_{10}$) in accordance with the present invention. That is, alternate 4S5S encoders may insert logic values at even positions of the codeword if the bit distance between the inserted logic values follows a 4-bit, 6-bit pattern or a 6-bit, 4-bit pattern within and between consecutive codewords. For example, an alternate 4S5S encoder may insert logic values at the $2^{nd}$ and $8^{th}$ codeword positions, in other words after the $1^{st}$ (i.e., $b_1$) and the $6^{th}$ (i.e., $b_6$) uncoded bits, so as to create a 10-bit codeword (i.e., $c_1, c_2, c_3, c_4, c_5, c_6, c_7, c_8, c_9, c_{10}$) in accordance with the present invention.

Figure 8:
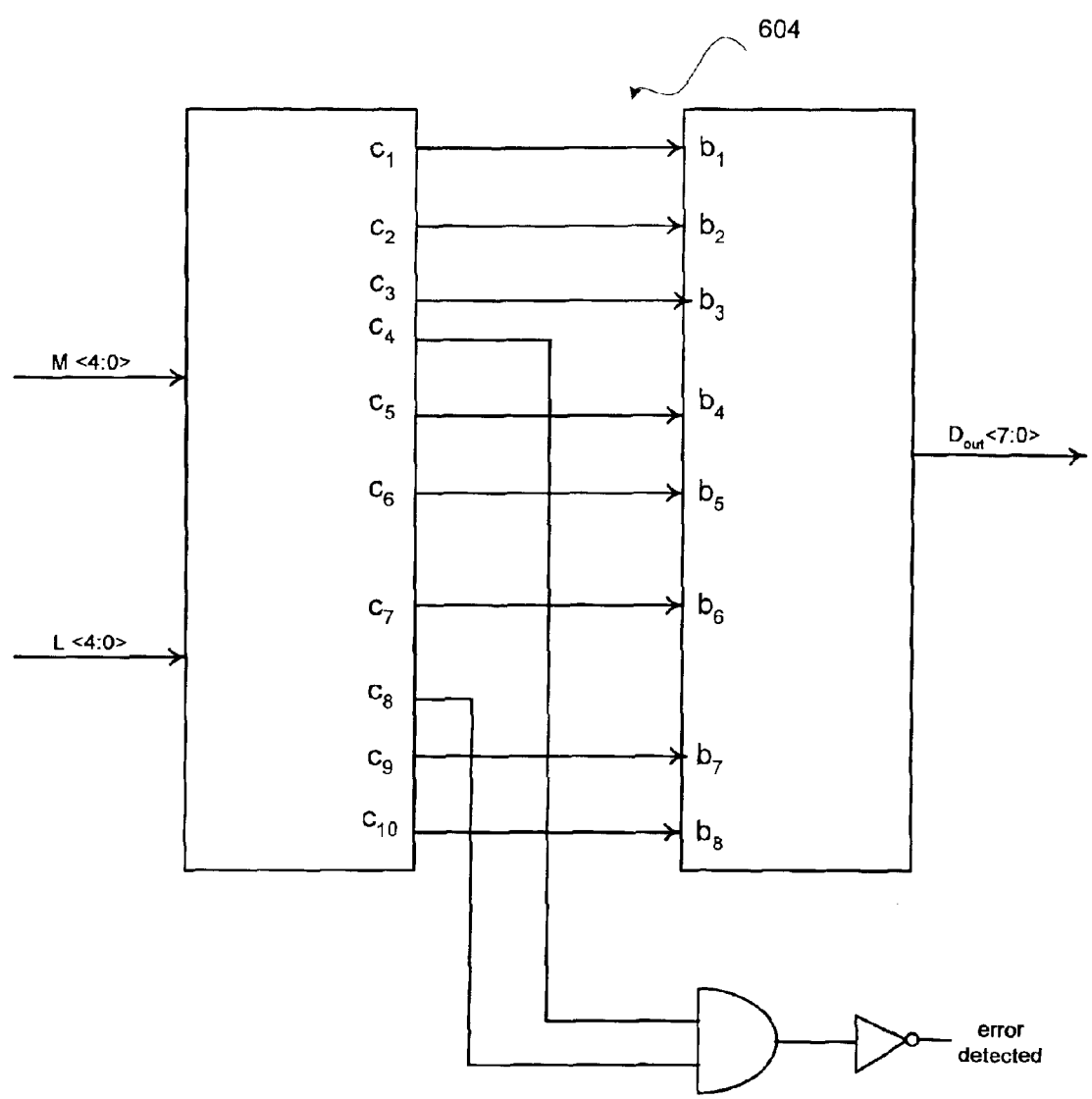
FIG. 8 shows a more detailed view of the 4S5S decoder shown in FIG. 6.

Referring to FIG. 8, there is shown a more detailed view of the 4S5S decoder 604 of FIG. 6, which corresponds to the encoder 602 of FIG. 7. As shown in FIG. 8, the 4S5S decoder 604 receives the MSB codeword (M<4:0>) and the LSB codeword (L<4:0>) so as to recreate the 10-bit codeword (i.e., $c_1, c_2, c_3, c_4, c_5, c_6, c_7, c_8, c_9, c_{10}$). The 4S5S decoder 604 then removes the $4^{th}$ (i.e., $c_4$) and the $8^{th}$ (i.e., $c_8$) codeword bits so as to recreate the uncoded 8-bit word (i.e., $b_1$, $b_2$, $b_3$, $b_4$, $b_5$, $b_6$, $b_7$, $b_8$), which is then provided as parallel output data $D_{out}<7:0>$. As shown in FIG. 8, the removed codeword bits (i.e., $c_4$ and $c_8$) may be used for error detection by determining if either of the removed codeword bits (i.e., $c_4$ and $c_8$) holds a logic "0" value. In general, if either of the removed codeword bits holds a complement logic value from its corresponding inserted logic value during encoding, then an error is indicated.

The above-described 4S5S transition-limiting code has several characteristic properties. First, the above-described 4S5S transition-limiting code requires only 25% overhead. Second, the above-described 4S5S transition-limiting code allows possible full-swing transitions only between data words (i.e., every $5^{th}$ symbol transition). Third, the above-described 4S5S transition-limiting code has a unique property wherein the two outer 4-PAM signal levels are periodically unused. That is, during the $2^{nd}$ symbol (i.e., bit pair {M<1>, L<1>}) and the $4^{th}$ symbol (i.e., bit pair {M<3>, L<3>}) the two outer 4-PAM signal levels (i.e., the highest and lowest signal levels) are not used (i.e., there are no transitions starting from or ending with these two outer 4-PAM signal levels). The periodic non-use of these two outer 4-PAM signal levels allows for their alternative use in framing codewords (i.e., identifying the boundary of a codeword), transmitting additional information (i.e., utilizing as spare bandwidth), providing a DC voltage balancing property to the transition-limiting code, and detecting errors (i.e., detecting improper signal presence). An example of a 4S5S code, in accordance with the present invention, is listed in FIG. 28D.

Figure 9:
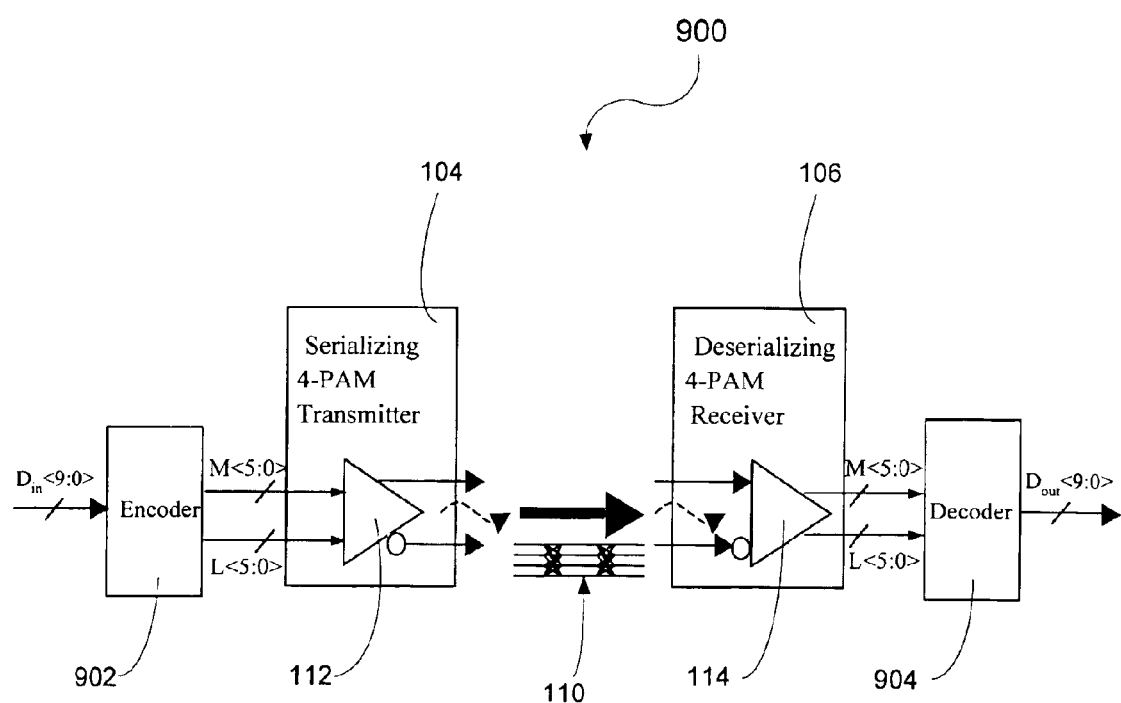
FIG. 9 shows a 4-PAM signaling system configured for implementing a 5S6S transition-limiting code in accordance with an embodiment of the present invention.

Referring to FIG. 9, there is shown a 4-PAM signaling system 900 configured for implementing a 5S6S transition-limiting code in accordance with an embodiment of the present invention. The system 900 of FIG. 9 is similar to the system 100 of FIG. 5, except that the system 900 of FIG. 9 specifically comprises a 5-symbol to 6-symbol (5S6S) encoder 902 and a 5-symbol from 6-symbol (5S6S) decoder 904 (i.e., a 5S6S codec implementation). The 5S6S transition-limiting code utilized in the 4-PAM signaling system 900 provides a modified 4-PAM sequence having a reduced number of full-swing transitions.

Similar to FIG. 5, the 5S6S encoder 902 shown in FIG. 9 receives parallel input data $D_{in}<9:0>$, and then encodes the received parallel input data $D_{in}<9:0>$ so as to provide parallel codewords to the serializing 4-PAM transmitter 104 that are organized as MSB codewords (M<5:0>) and LSB codewords (L<5:0>). The MSB codewords (M<5:0>) and the LSB codewords (L<5:0>) together form multiple consecutive symbols. That is, each symbol is formed from a concatenation of an MSB codeword bit (e.g., M<2>) and an LSB codeword bit (e.g., L<2>), thereby forming a bit pair (e.g., {M<2>, L<2>}). The parallel input data $D_{in}<9:0>$ is received as a 10-bit word. The MSB codewords (M<5:0>) and the LSB codewords (L<5:0>) each have 6 bits.

Also similar to FIG. 5, the 5S6S decoder 904 shown in FIG. 9 receives the MSB codewords (M<5:0>) and the LSB codewords (L<5:0>) in parallel form from the deserializing 4-PAM receiver 106, and then decodes the received MSB codewords (M<5:0>) and the received LSB codewords (L<5:0>) so as to provide parallel output data $D_{out}<9:0>$. The received MSB codewords (M<5:0>) and the received LSB codewords (L<5:0>) each have 6 bits. The parallel output data $D_{out}<9:0>$ is provided as a 10-bit word.

Figure 10:
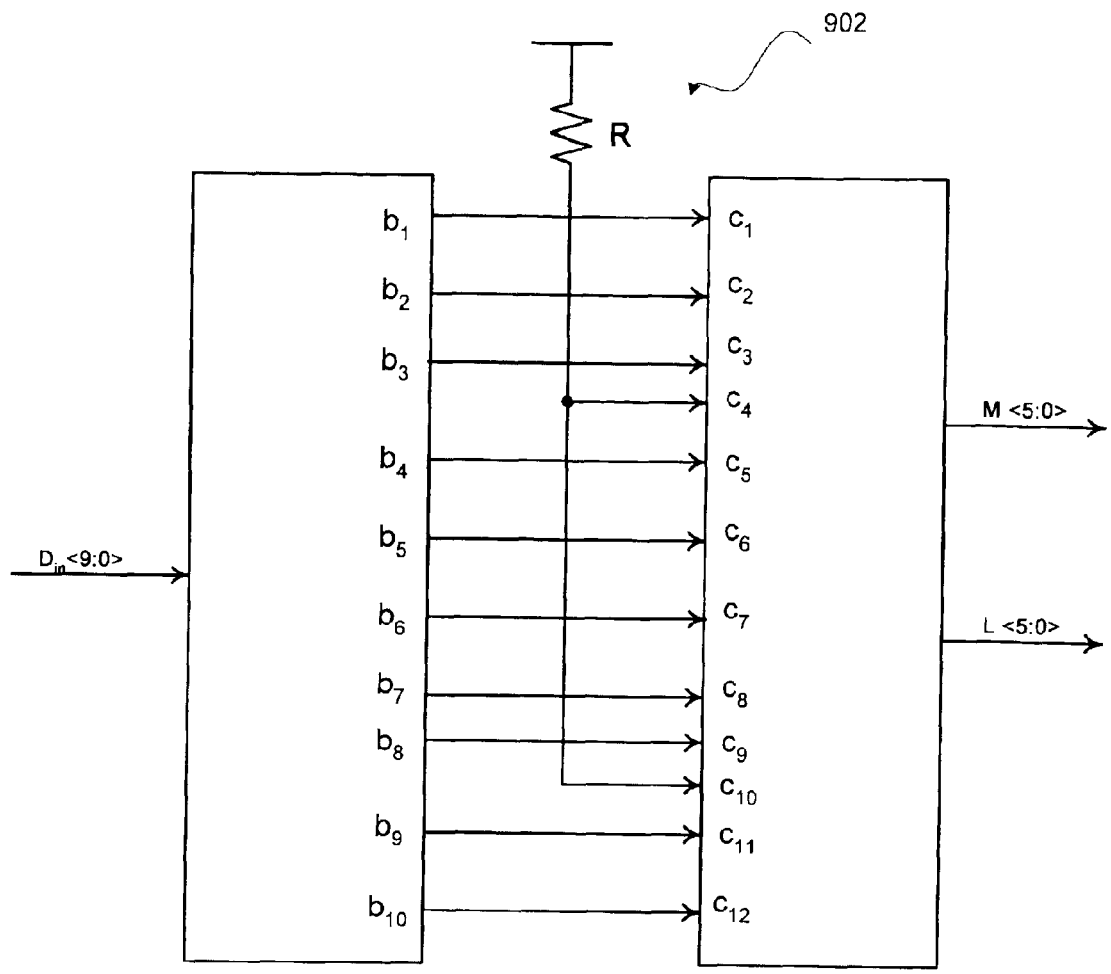
FIG. 10 shows a more detailed view of the 5S6S encoder shown in FIG. 9.

Referring to FIG. 10, there is shown a more detailed view of the 5S6S encoder 902 of FIG. 9. As shown in FIG. 10, the 5S6S encoder 902 receives parallel input data $D_{in}<9:0>$ as an uncoded 10-bit word (i.e., $b_1$, $b_2$, $b_3$, $b_4$, $b_5$, $b_6$, $b_7$, $b_8$, $b_9$, $b_{10}$) The 5S6S encoder 902 inserts logic "1" values after the $3^{rd}$ (i.e., $b_3$) and the $8^{th}$ (i.e., $b_8$) uncoded bits so as to create a 12-bit codeword (i.e., $c_1$, $c_2$, $c_3$, $c_4$, $c_5$, $c_6$, $c_7$, $c_8$, $c_9$, $c_{10}$, $c_{11}$, $c_{12}$). The 12-bit codeword is then organized as an MSB codeword (M<5:0>) containing 6 codeword bits (i.e., $c_1$, $c_3$, $c_5$, $c_7$, $c_9$, $c_{11}$) and an LSB codeword (L<5:0>) containing 6 codeword bits (i.e., $c_2$, $c_4$, $c_6$, $c_8$, $c_{10}$, $c_{12}$) . As described above, the MSB codeword (M<5:0>) and the LSB codeword (L<5:0>) are then provided to the serializing 4-PAM transmitter 104.

At this point it should be noted that alternate 5S6S encoders may insert logic values after other ones of the uncoded bits so as to create 12-bit codewords (i.e., $c_1$, $c_2$, $c_3$, $c_4$, $c_5$, $c_6$, $c_7$, $c_8$, $c_9$, $c_{10}$, $c_{11}$, $c_{12}$) in accordance with the present invention. That is, alternate 5S6S encoders may insert logic values at even positions of the codeword if the bit distance between the inserted logic values follows a 6-bit, 6-bit pattern, a 4-bit; 8-bit pattern, or a 8-bit, 4-bit pattern within and between consecutive codewords. For example, an alternate 5S6S encoder may insert logic values after the $1^{st}$ (i.e., $b_1$) and the $6^{th}$ (i.e., $b_6$) uncoded bits so as to create a 12-bit codeword (i.e., $c_1$, $c_2$, $c_3$, $c_4$, $c_5$, $c_6$, $c_7$, $c_8$, $c_9$, $c_{10}$, $c_{11}$, $c_{12}$) in accordance with the present invention.

Figure 11:
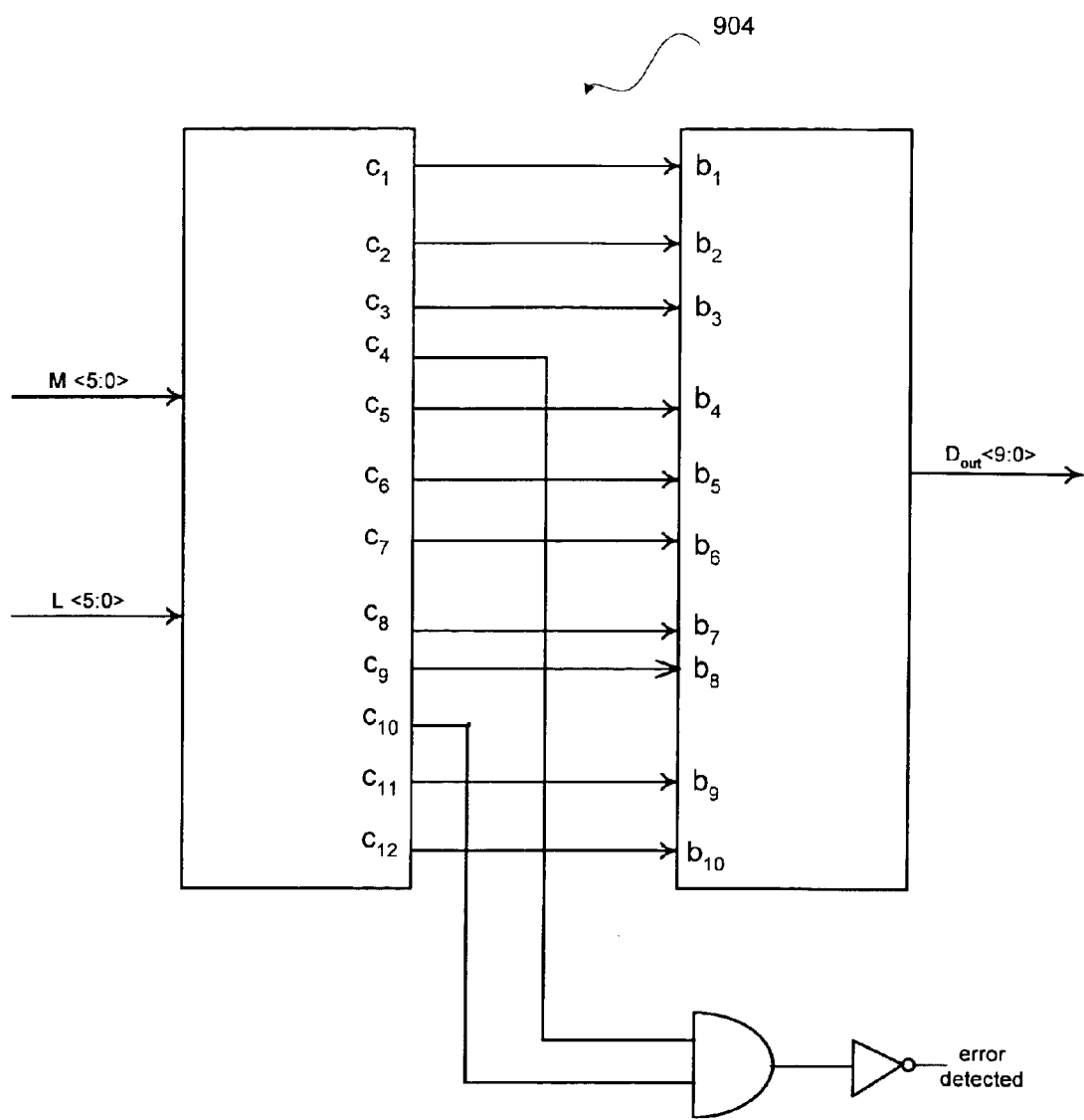
FIG. 11 shows a more detailed view of the 5S6S decoder shown in FIG. 9.

Referring to FIG. 11, there is shown a more detailed view of the 5S6S decoder 904 of FIG. 9, which corresponds to the encoder 902 of FIG. 10. As shown in FIG. 11, the 5S6S decoder 904 receives the MSB codeword (M<5:0>) and the LSB codeword (L<5:0>) so as to recreate the 12-bit codeword (i.e., $c_1$, $c_2$, $c_3$, $c_4$, $c_5$, $c_6$, $c_7$, $c_8$, $c_9$, $c_{10}$, $c_{11}$, $c_{12}$). The 5S6decoder 904 then removes the $4^{th}$ (i.e., $c_4$) and the $10^{th}$ (i.e., $c_{10}$) codeword bits so as to recreate the uncoded 10-bit word (i.e., $b_1$, $b_2$, $b_3$, $b_4$, $b_5$, $b_6$, $b_7$, $b_8$, $b_9$, $b_{10}$), which is then provided as parallel output data $D_{out}<9:0>$. As shown in FIG. 11, the removed codeword bits (i.e., $c_4$ and $c_{10}$) may be used for error detection by determining if either of the removed codeword bits (i.e., $c_4$ and $c_{10}$) holds a logic "0" value. In general, if either of the removed codeword bits holds a complement logic value from its corresponding inserted logic value during encoding, then an error is indicated.

The above-described 5S6S transition-limiting code has several characteristic properties. First, the above-described 5S6S transition-limiting code requires only 20% overhead. Second, the above-described 5S6S transition-limiting code allows possible full-swing transitions only every $3^{rd}$ symbol transition (i.e., 88% full swing transition compliant codewords). Third, the above-described 5S6S transition-limiting code has a unique property wherein the two outer 4-PAM signal levels are periodically unused. That is, during the $2^{nd}$ symbol (i.e., bit pair {M<1>, L<1>}) and the $5^{th}$ symbol (i.e., bit pair {M<4>, L<4>}) the two outer 4-PAM signal levels (i.e., the highest and lowest signal levels) are not used (i.e., there are no transitions starting from or ending with these two outer 4-PAM signal levels). The periodic non-use of these two outer 4-PAM signal levels allows for their alternative use in framing codewords (i.e., identifying the boundary of a codeword), transmitting additional information (i.e., utilizing as spare bandwidth), providing a DC voltage balancing property to the transition-limiting code, and detecting errors (i.e., detecting improper signal presence). Fourth, the above-described 5S6S transition-limiting code has 984 CDR-compliant codewords and only 40 CDR-non-compliant codewords (i.e. 96.1% CDR-compliant codewords). That is, for every six symbols, the above-described 5S6S transition-limiting code has at least one "good" CDR transition wherein the signal crossing point is geometrically centered between symbols. Some examples of 5S6S codes in accordance with the present invention are listed in FIG. 28D.

Figure 12:
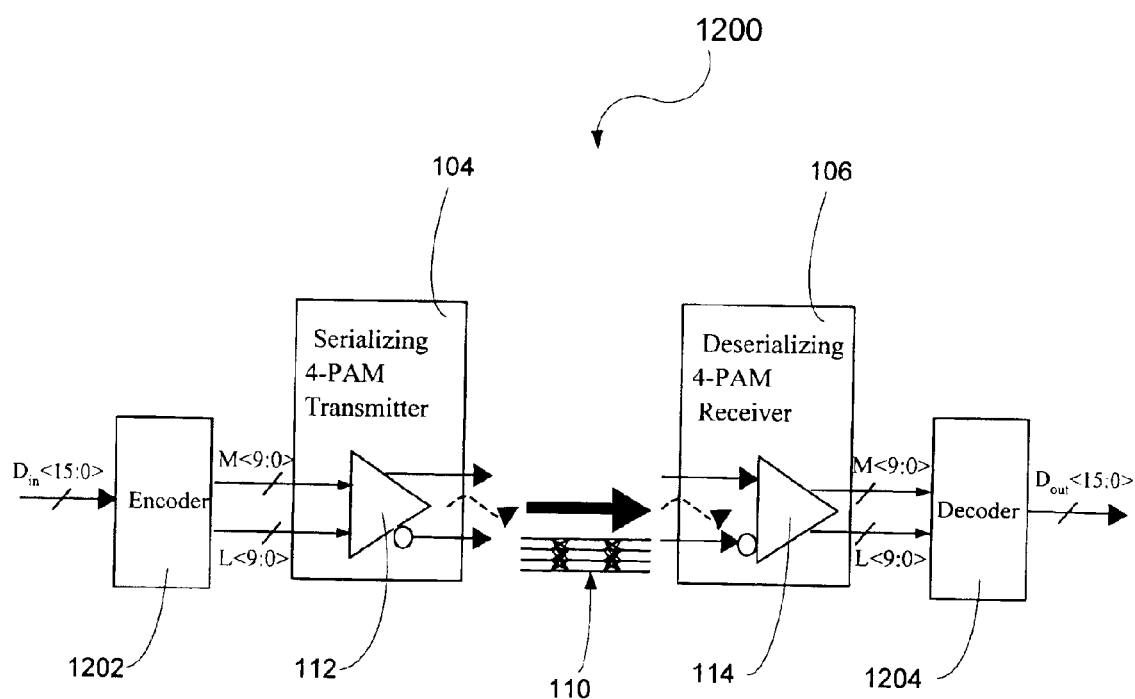
FIG. 12 shows a 4-PAM signaling system configured for implementing a 8S10S transition-limiting code in accordance with an embodiment of the present invention.

Referring to FIG. 12, there is shown a 4-PAM. signaling system 1200 configured for implementing a 8S10S transition-limiting code in accordance with an embodiment of the present invention. The system 1200 of FIG. 12 is similar to the system 100 of FIG. 5, except that the system 1200 of FIG. 12 specifically comprises a 8-symbol to 10-symbol (8S10S) encoder 1202 and a 8-symbol from 10-symbol (8S10S) decoder 1204 (i.e., an 8S10S codec implementation). The 8S10S transition-limiting code utilized in the 4-PAM signaling system 1200 provides a modified 4-PAM sequence having a reduced number of full-swing transitions.

Similar to FIG. 5, the 8S10S encoder 1202 shown in FIG. 12 receives parallel input data $D_{in}$<15:0>, and then encodes the received parallel input data $D_{in}$15:0> so as to provide parallel codewords to the serializing 4-PAM transmitter 104 that are organized as MSB codewords (M<9:0>) and LSB codewords (L<9:0>). The MSB codewords (M<9:0>) and the LSB codewords (L<9:0>) together form multiple consecutive symbols. That is, each symbol is formed from a concatenation of an MSB codeword bit (e.g., M<2>) and an LSB codeword bit (e.g., L<2>), thereby forming a bit pair (e.g., {M<2>, L<2>}). The parallel input data $D_{in}$<15:0> is received as a 16-bit word. The MSB codewords (M<9:0>) and the LSB codewords (L<9:0>) each have 10 bits.

Also similar to FIG. 5, the 8S10S decoder 1204 shown in FIG. 12 receives the MSB codewords (M<9:0>) and the LSB codewords (L<9:0>) in parallel form from the deserializing 4-PAM receiver 106, and then decodes the received MSB codewords (M<9:0>) and the received LSB codewords (L<9:0>) so as to provide parallel output data $D_{out}$<15:0>. The received MSB codewords (M<9:0>) and the received LSB codewords (L<9:0>) each have 10 bits. The parallel output data $D_{out}$<15:0> is provided as a 16-bit word.

Figure 13:
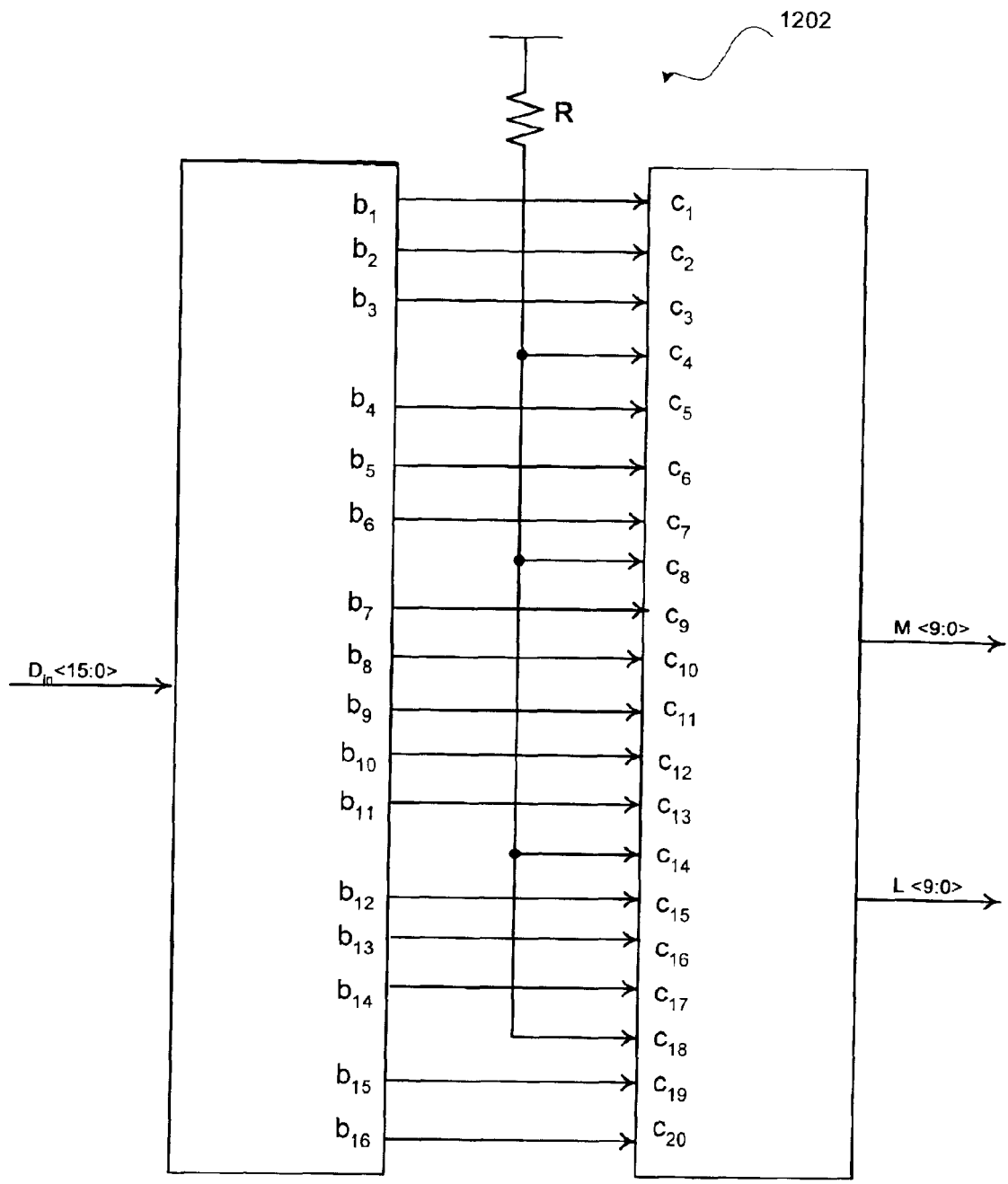
FIG. 13 shows a more detailed view of the 8S10S encoder shown in FIG. 12.

Referring to FIG. 13, there is shown a more detailed view of the 8S10S encoder 1202 of FIG. 12. As shown in FIG. 13, the 8S10S encoder 1202 receives parallel input data $D_{in}$<15:0> as an uncoded 16-bit word (i.e., $b_1, b_2, b_3, b_4, b_5, b_6, b_7, b_8, b_9, b_{10}, b_{11}, b_{12}, b_{13}, b_{14}, b_{15}, b_{16}$). The 8S10S encoder 1202 inserts logic "1" values after the $3^{rd}$ (i.e., $b_3$), $6^{th}$ (i.e., $b_6$), $11^{th}$ (i.e., $b_{11}$), and $14^{th}$ (i.e., $b_{14}$) uncoded bits so as to create a 20-bit codeword (i.e., $c_1, c_2, c_3, c_4, c_5, c_6, c_7, c_8, c_9, c_{10}, c_{11}, c_{12}, c_{13}, c_{14}, c_{15}, c_{16}, c_{17}, c_{18}, c_{19}, c_{20}$). The 20-bit codeword is then organized as an MSB codeword (M<9:0>) containing 10 codeword bits (i.e., $c_1, c_3, c_5, c_7, c_9, c_{11}, c_{13}, c_{15}, c_{17}, c_{19}$) and an LSB codeword (L<9:0>) containing 10 codeword bits (i.e., $c_2, c_4, c_6, c_8, c_{10}, c_{12}, c_{14}, c_{16}, c_{18}, c_{20}$). As described above, the MSB codeword (M<9:0>) and the LSB codeword (L<9:0>) are then provided to the serializing 4-PAM transmitter 104.

At this point it should be noted that alternate 8S10S encoders may insert logic values after other ones of the uncoded bits so as to create 20-bit codewords (i.e., $c_1, c_2, c_3, c_4, c_5, c_6, c_7, c_8, c_9, c_{10}, c_{11}, c_{12}, c_{13}, c_{14}, c_{15}, c_{16}, c_{17}, c_{18}, c_{19}, c_{20}$) in accordance with the present invention. That is, alternate 8S10S encoders may insert logic values at even positions of the codeword if the bit distance between the inserted logic values follows a 4-bit, 6-bit, 4-bit, 6-bit pattern within and between consecutive codewords. For example, an alternate 8S10S encoder may insert logic values after the $1^{st}$ (i.e., $b_1$), $4^{th}$ (i.e., $b_4$), $9^{th}$ (i.e., $b_9$), and $12^{th}$ (i.e., $b_{12}$) uncoded bits so as to create a 20-bit codeword (i.e., $c_1, c_2, c_3, c_4, c_5, c_6, c_7, c_8, c_9, c_{10}, c_{11}, c_{12}, c_{13}, c_{14}, c_{15}, c_{16}, c_{17}, c_{18}, c_{19}, c_{20}$) in accordance with the present invention.

Figure 14:
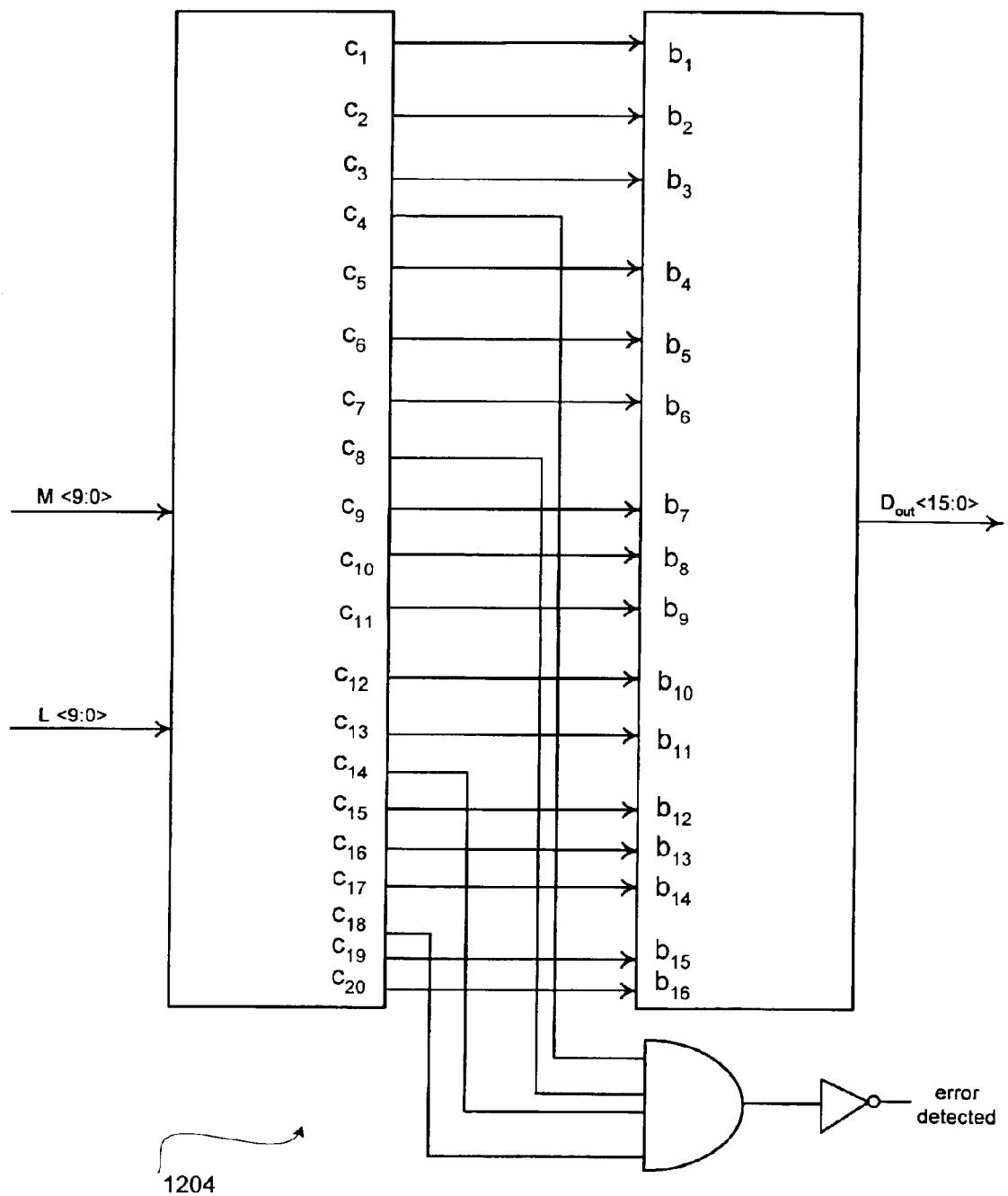
FIG. 14 shows a more detailed view of the 8S10S decoder shown in FIG. 12.

Referring to FIG. 14, there is shown a more detailed view of the 8S10S decoder 1204 of FIG. 12, which corresponds to the encoder 1202 of FIG. 13. As shown in FIG. 14, the 8S10S decoder 1204 receives the MSB codeword (M<9:0>) and the LSB codeword (L<9:0>) so as to recreate the 20-bit codeword (i.e., $c_1, c_2, c_3, c_4, c_5, c_6, c_7, c_8, c_9, c_{10}, c_{11}, c_{12}, c_{13}, c_{14}, c_{15}, c_{16}, c_{17}, c_{18}, c_{19}, c_{20}$). The 8S10S decoder 1204 then removes the $4^{th}$ (i.e., $c_4$), $8^{th}$ (i.e., $c_8$), $14^{th}$ (i.e., $c_{14}$), and $18^{th}$ (i.e., $c_{18}$) codeword bits so as to recreate the uncoded 16-bit word (i.e., $b_1, b_2, b_3, b_4, b_5, b_6, b_7, b_8, b_9, b_{10}, b_{11}, b_{12}, b_{13}, b_{14}, b_{15}, b_{16}$), which is then provided as parallel output data $D_{out}$<15:0>. As shown in FIG. 14, the removed codeword bits (i.e., $c_4, c_8, c_{14}$, and $c_{18}$) may be used for error detection by determining if any of the removed codeword bits (i.e., $c_4, c_8, c_{14}$, and $c_{18}$) holds a logic "0" value. In general, if any of the removed codeword bits holds a complement logic value from its corresponding inserted logic value during encoding, then an error is indicated.

The above-described 10S10S transition-limiting code has several characteristic properties. First, the above-described 8S10S transition-limiting code requires only 25% overhead. Second, the above-described 8S10S transition-limiting code allows possible full-swing transitions only every $5^{th}$ symbol transition. Third, the above-described 8S10S transition-limiting code has a unique property wherein the two outer 4-PAM signal levels are periodically unused. That is, during the $2^{nd}$ symbol (i.e., bit pair {M<1>, L<1>}), $4^{th}$ symbol (i.e., bit pair {M<3>, L<3>}), $7^{th}$ symbol (i.e., bit pair {M<6>, L<6>}), and $9^{th}$ symbol (i.e., bit pair {M<8>, L<8>}) the two outer 4-PAM signal levels (i.e., the highest and lowest signal levels) are not used (i.e., there are no transitions starting from or ending with these two outer 4-PAM signal levels). The periodic non-use of these two outer 4-PAM signal levels allows for their alternative use in framing codewords (i.e., identifying the boundary of a codeword), transmitting additional information (i.e., utilizing as spare bandwidth), and detecting errors (i.e., detecting improper signal presence). An example of a 8S10S code, in accordance with the present invention, is listed in FIG. 28D.

Figure 15:
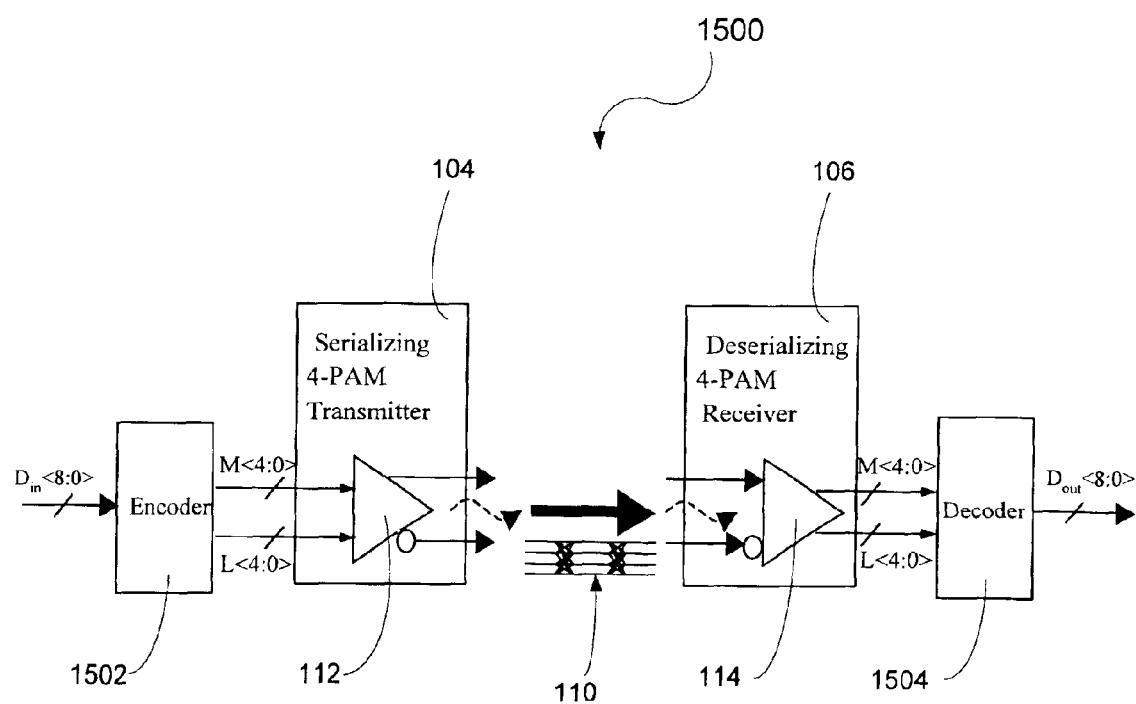
FIG. 15 shows a 4-PAM signaling system configured for implementing a 9b10b transition-limiting code in accordance with an embodiment of the present invention.

Referring to FIG. 15, there is shown a 4-PAM signaling system 1500 configured for implementing a 9b10b transition-limiting code in accordance with an embodiment of the present invention. The system 1500 of FIG. 15 is similar to the system 100 of FIG. 5, except that the system 1500 of FIG. 15 specifically comprises a 9-bit to 10-bit (9b10b) encoder 1502 and a 9-bit from 10-bit (9b10b) decoder 1504 (i.e., a 9b10b codec implementation). The 9b10b transition-limiting code utilized in the 4-PAM signaling system 1500 provides a modified 4-PAM sequence having a reduced number of full-swing transitions.

Similar to FIG. 5, the 9b10b encoder 1502 shown in FIG. 15 receives parallel input data $D_{in}$<8:0>, and then encodes the received parallel input data $D_{in}$<8:0> so as to provide parallel codewords to the serializing 4-PAM transmitter 104 that are organized as MSB codewords (M<4:0>) and LSB codewords (L<4:0>). The MSB codewords (M<4:0>) and the LSB codewords (L<4:0>) together form multiple consecutive symbols. That is, each symbol is formed from a concatenation of an MSB codeword bit (e.g., M<2>) and an LSB codeword bit (e.g., L<2>), thereby forming a bit pair (e.g., {M<2>, L<2>}). The parallel input data $D_{in}$<8:0> is received as a 9-bit word. The MSB codewords (M<4:0>) and the LSB codewords (L<4:0>) each have 5 bits.

Also similar to FIG. 5, the 9b10b decoder 1504 shown in FIG. 15 receives the MSB codewords (M<4:0>) and the LSB codewords (L<4:0>) in parallel form from the deserializing 4-PAM receiver 106, and then decodes the received MSB codewords (M<4:0>) and the received LSB codewords (L<4:0>) so as to provide parallel output data $D_{out}$<8:0>. The received MSB codewords (M<4:0>) and the received LSB codewords (L<4:0>) each have 5 bits. The parallel output data $D_{out}$<8:0> is provided as a 9-bit word.

Figure 16:
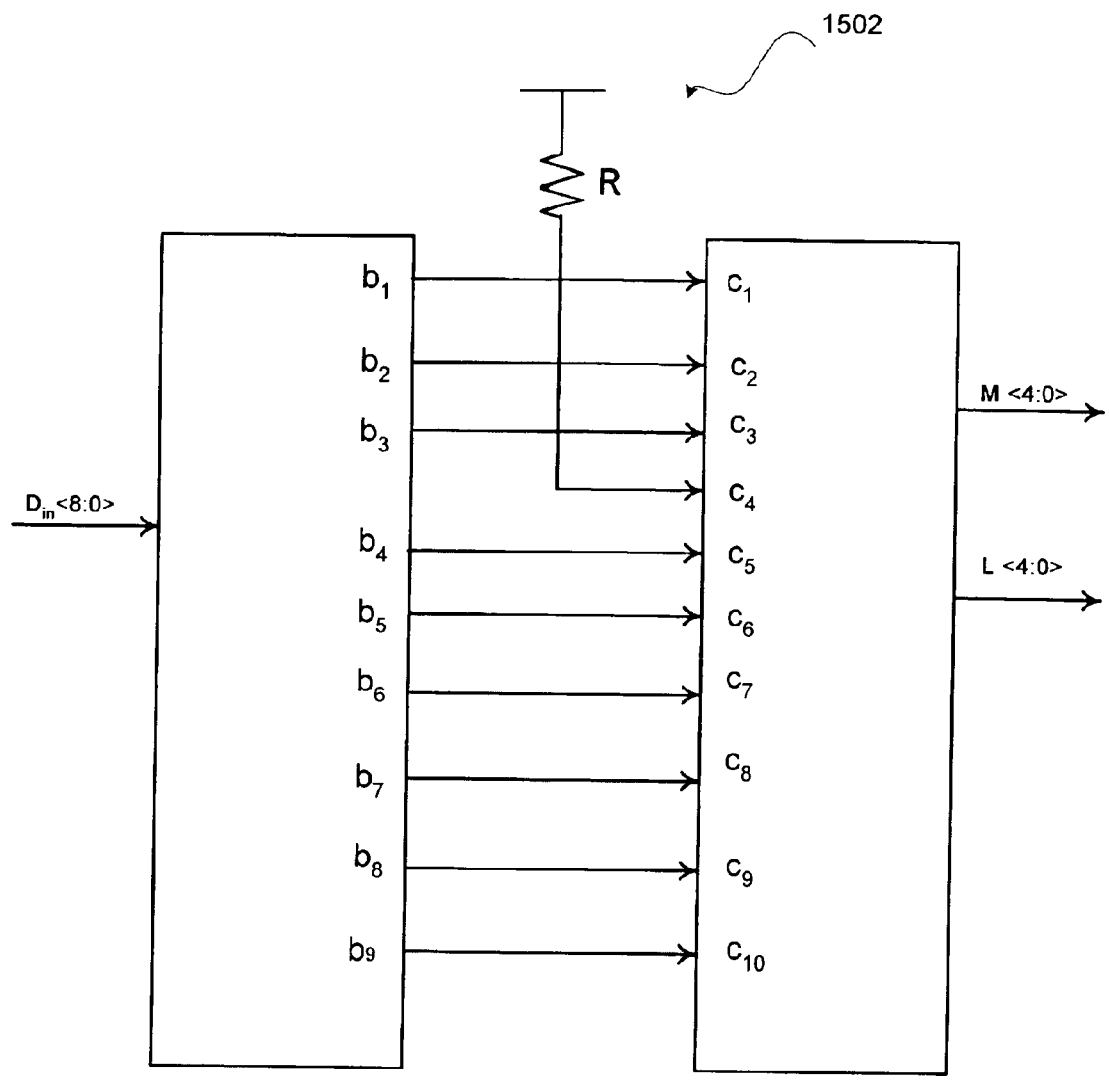
FIG. 16 shows a more detailed view of the 9b10b encoder of FIG. 15.

Referring to FIG. 16, there is shown a more detailed view of the 9b10b encoder 1502 of FIG. 15. As shown in FIG. 16, the 9b10b encoder 1502 receives parallel input data $D_{in}$<8:0> as an uncoded 9-bit word (i.e., $b_1, b_2, b_3, b_4, b_5, b_6, b_7, b_8, b_9$). The 9b10b encoder 1502 inserts a logic "1" value after the $3^{rd}$ (i.e., $b_3$) uncoded bit so as to create a 10-bit codeword (i.e., $c_1, c_2, c_3, c_4, c_5, c_6, c_7, c_8, c_9, c_{10}$). The 10-bit codeword is then organized as an MSB codeword (M<4:0>) containing 5 codeword bits (i.e., $c_1, c_3, c_5, c_7, c_9$) and an LSB codeword (L<4:0>) containing 5 codeword bits (i.e., $c_2, c_4, c_6, c_8, c_{10}$). As described above, the MSB codeword (M<4:0>) and the LSB codeword (L<4:0>) are then provided to the serializing 4-PAM transmitter 104.

At this point it should be noted that alternate 9b10b encoders may insert logic values after other ones of the uncoded bits so as to create 10-bit codewords (i.e., $c_1, c_2, c_3, c_4, c_5, c_6, c_7, c_8, c_9, c_{10}$) in accordance with the present invention. That is, alternate 9b10b encoders may insert a logic value after any odd (e.g., $b_5$) uncoded bit. The bit distance between the inserted logic values follows a 10-bit pattern between consecutive codewords. For example, an alternate 9b10b encoder may insert logic values after the $5^{th}$ (i.e., $b_5$) uncoded bit so as to create a 10-bit codeword (i.e., $c_1, c_2, c_3, c_4, c_5, c_6, c_7, c_8, c_9, c_{10}$) in accordance with the present invention.

Figure 17:
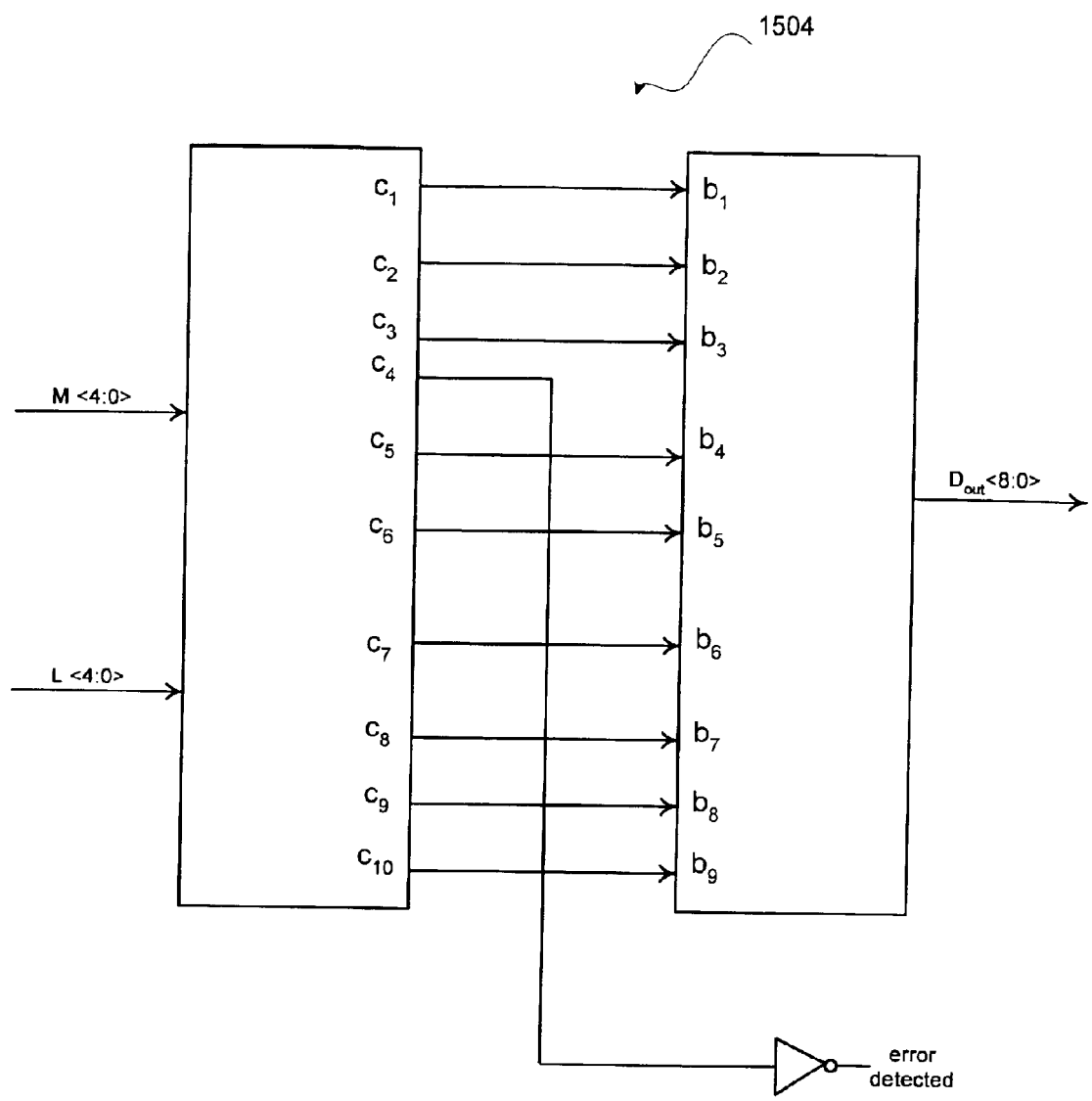
FIG. 17 shows a more detailed view of the 9b10b decoder shown in FIG. 15.

Referring to FIG. 17, there is shown a more detailed view of the 9b10b decoder 1504 of FIG. 15, which corresponds to the encoder 1502 of FIG. 16. As shown in FIG. 17, the 9b10b decoder 1504 receives the MSB codeword (M<4:0>) and the LSB codeword (L<4:0>) so as to recreate the 10-bit codeword (i.e., $c_1, c_2, c_3, c_4, c_5, c_6, c_7, c_8, c_9, c_{10}$). The 9b10b decoder 1504 then removes the $4^{th}$ (i.e., $c_4$) codeword bit so as to recreate the uncoded 9-bit word (i.e., $b_1, b_2, b_3, b_4, b_5, b_6, b_7, b_8, b_9$) which is then provided as parallel output data $D_{out}$<8:0>. As shown in FIG. 17, the removed codeword bit (i.e., $c_4$) may be used for error detection by determining if the removed codeword bit (i.e., $c_4$) holds a logic "0" value. In general, if the removed codeword bit holds a complement logic value from its corresponding inserted logic value during encoding, then an error is indicated.

The above-described 9b10b transition-limiting code has several characteristic properties. First, the above-described 9b10b transition-limiting code requires only 11% overhead. Second, the above-described 9b10b transition-limiting code eliminates two consecutive full-swing symbol transitions for every three allowed full-swing symbol transitions. Third, the above-described 9b10b transition-limiting code has a unique property wherein the two outer 4-PAM signal levels (i.e., the highest and lowest signal levels) are periodically unused (i.e., there are no transitions starting from or ending with these two outer 4-PAM signal levels). The periodic non-use of these two outer 4-PAM signal levels allows for their alternative use in framing codewords (i.e., identifying the boundary of a codeword), transmitting additional information (i.e., utilizing as spare bandwidth), and detecting errors (i.e., detecting improper signal presence). Fourth, full-swing symbol transitions between data words may be prevented if a logic "1" value is inserted after the 1st (i.e., $b_1$) uncoded bit when creating the 10-bit codeword (i.e., $c_1, c_2, c_3, c_4, c_5, c_6, c_7, c_8, c_9, c_{10}$). An example of a 9b10b transition-limiting code, in accordance with the present invention, is listed in FIG. 28D.

Figure 18:
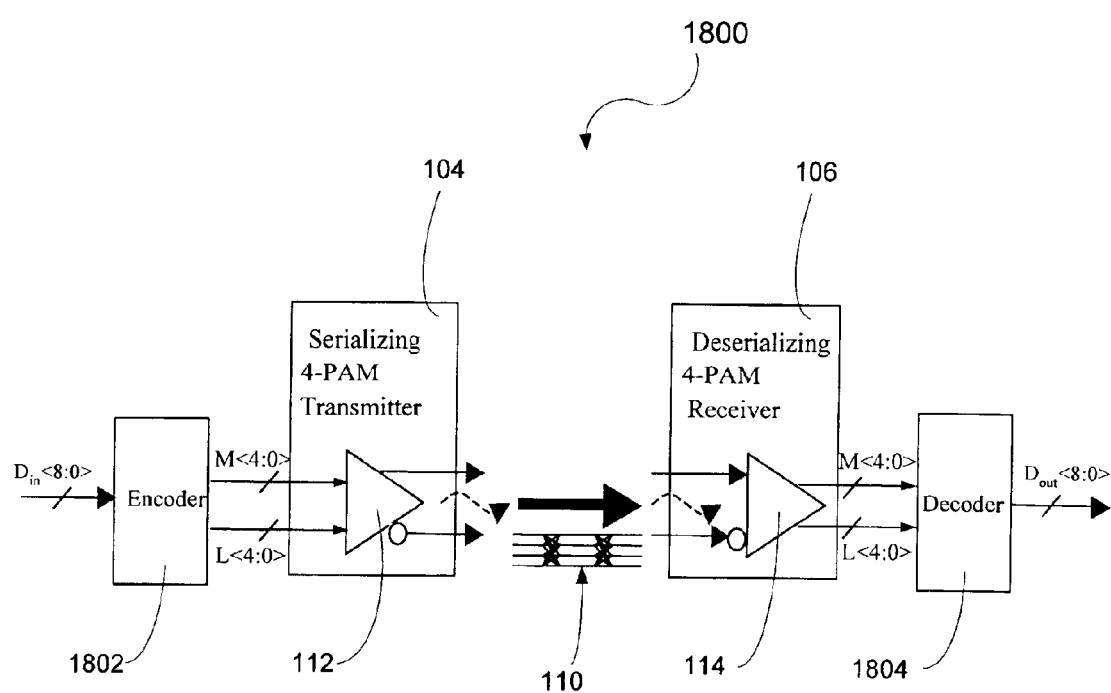
FIG. 18 shows a 4-PAM signaling system configured for implementing an alternative 9b10b transition-limiting code in accordance with an embodiment of the present invention.

Referring to FIG. 18, there is shown a 4-PAM signaling system 1800 configured for implementing an alternative 9b10b transition-limiting code in accordance with an embodiment of the present invention. The system 1800 of FIG. 18 is similar to the system 100 of FIG. 5, except that the system 1800 of FIG. 18 specifically comprises a 9-bit to 10-bit (9b10b) encoder 1802 and a 9-bit from 10-bit (9b10b) decoder 1804 (i.e., a 9b10b codec implementation). The 9b10b transition-limiting code utilized in the 4-PAM signaling system 1800 provides a modified 4-PAM sequence having a reduced number of full-swing transitions.

Similar to FIG. 5, the 9b10b encoder 1802 shown in FIG. 18 receives parallel input data $D_{in}$<8:0>, and then encodes the received parallel input data $D_{in}$<8:0> so as to provide parallel codewords to the serializing 4-PAM transmitter 104 that are organized as MSB codewords (M<4:0>) and LSB codewords (L<4:0>). The MSB codewords (M<4:0>) and the LSB codewords (L<4:0>) together form multiple consecutive symbols. That is, each symbol is formed from a concatenation of an MSB codeword bit (e.g., M<2>) and an LSB codeword bit (e.g., L<2>), thereby forming a bit pair (e.g., {M<2>, L<2>}). The parallel input data $D_{in}$<8:0> is received as a 9-bit word. The MSB codewords (M<4:0>) and the LSB codewords (L<4:0>) each have 5 bits.

Also similar to FIG. 5, the 9b10b decoder 1804 shown in FIG. 18 receives the MSB codewords (M<4:0>) and the LSB codewords (L<4:0>) in parallel form from the deserializing 4-PAM receiver 106, and then decodes the received MSB codewords (M<4:0>) and the received LSB codewords (L<4:0>) so as to provide parallel output data $D_{out}$<8:0>. The received MSB codewords (M<4:0>) and the received LSB codewords (L<4:0>) each have 5 bits. The parallel output data $D_{out}$<8:0> is provided as a 9-bit word.

Figure 19:
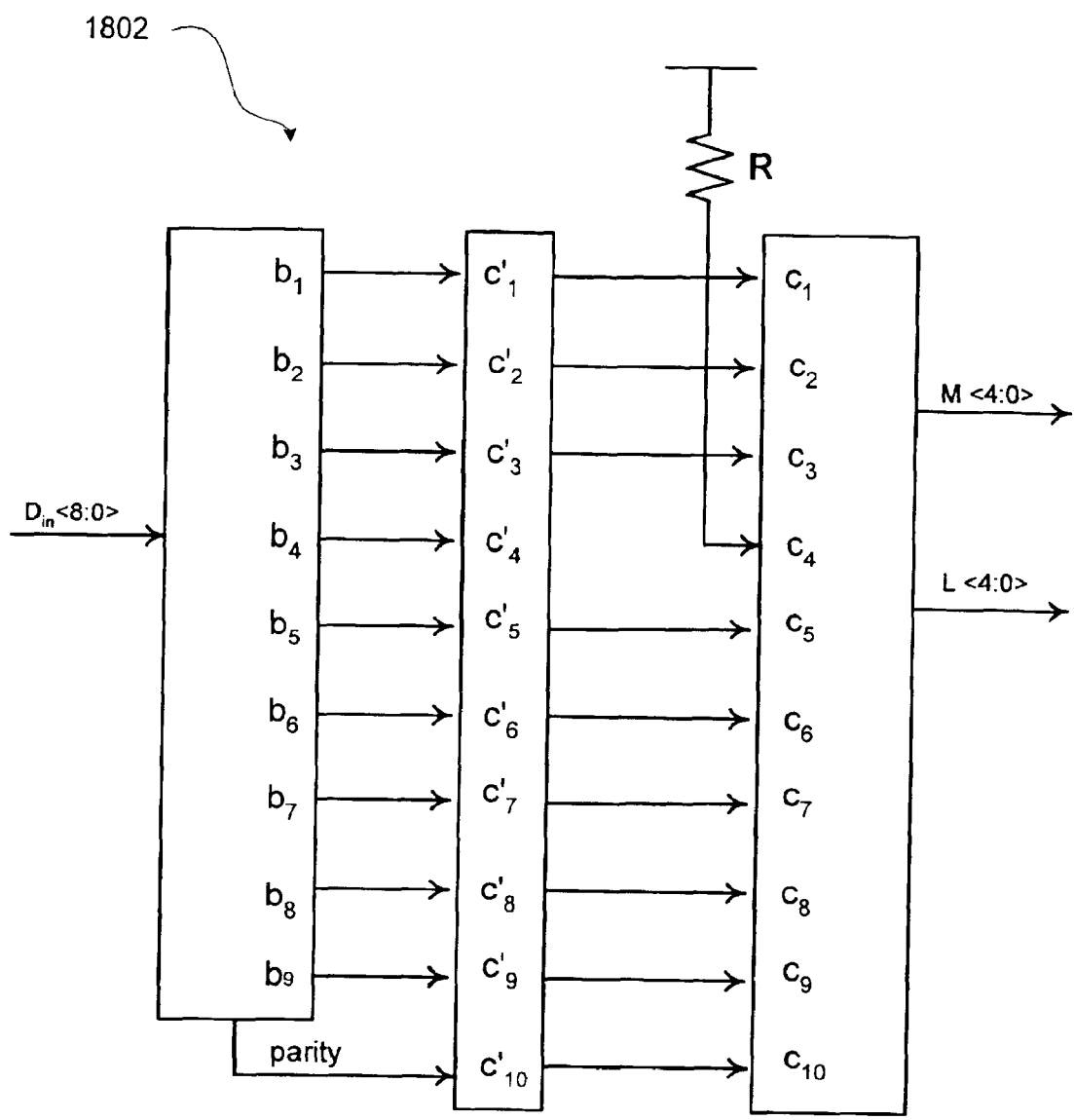
FIG. 19 shows a more detailed view of the 9b10b encoder shown in FIG. 18.

Referring to FIG. 19, there is shown a more detailed view of the 9b10b encoder 1802 of FIG. 18. As shown in FIG. 19, the 9b10b encoder 1802 receives parallel input data $D_{in}$<8:0> as an uncoded 9-bit word (i.e., $b_1, b_2, b_3, b_4, b_5, b_6, b_7, b_8, b_9$). The 9b10b encoder 1802 adds an even (odd) parity bit (i.e., $c'_{10}$) so as to create a 10-bit intermediate word (i.e., $c'_1, c'_2, c'_3, c'_4, c'_5, c'_6, c'_7, c'_8, c'_9, c'_{10}$), and then sets the $4^{th}$ (i.e., $b_4$ or $c'_4$) uncoded bit to a logic "1" value (or a logic "0" value) so as to create a 10-bit codeword (i.e., $c_1, c_2, c_3, c_4, c_5, c_6, c_7, c_8, c_9, c_{10}$). The 10-bit codeword is then organized as an MSB codeword (M<4:0>) containing 5 codeword bits (i.e., $c_1, c_3, c_5, c_7, c_9$) and an LSB codeword (L<4:0>) containing 5 codeword bits (i.e., $c_2, c_4, c_6, c_8, c_{10}$). As described above, the MSB codeword (M<4:0>) and the LSB codeword (L<4:0>) are then provided to the serializing 4-PAM transmitter 104.

At this point it should be noted that the 9b10b encoder 1802 may alternatively set the $6^{th}$ (i.e., $b_6$) or the $8^{th}$ (i.e., $b_8$) uncoded bit to a logic "1" value (or a logic "0" value) so as to create the 10-bit codeword (i.e., $c_1, c_2, c_3, c_4, c_5, c_6, c_7, c_8, c_9, c_{10}$) in accordance with the present invention.

Figure 20:
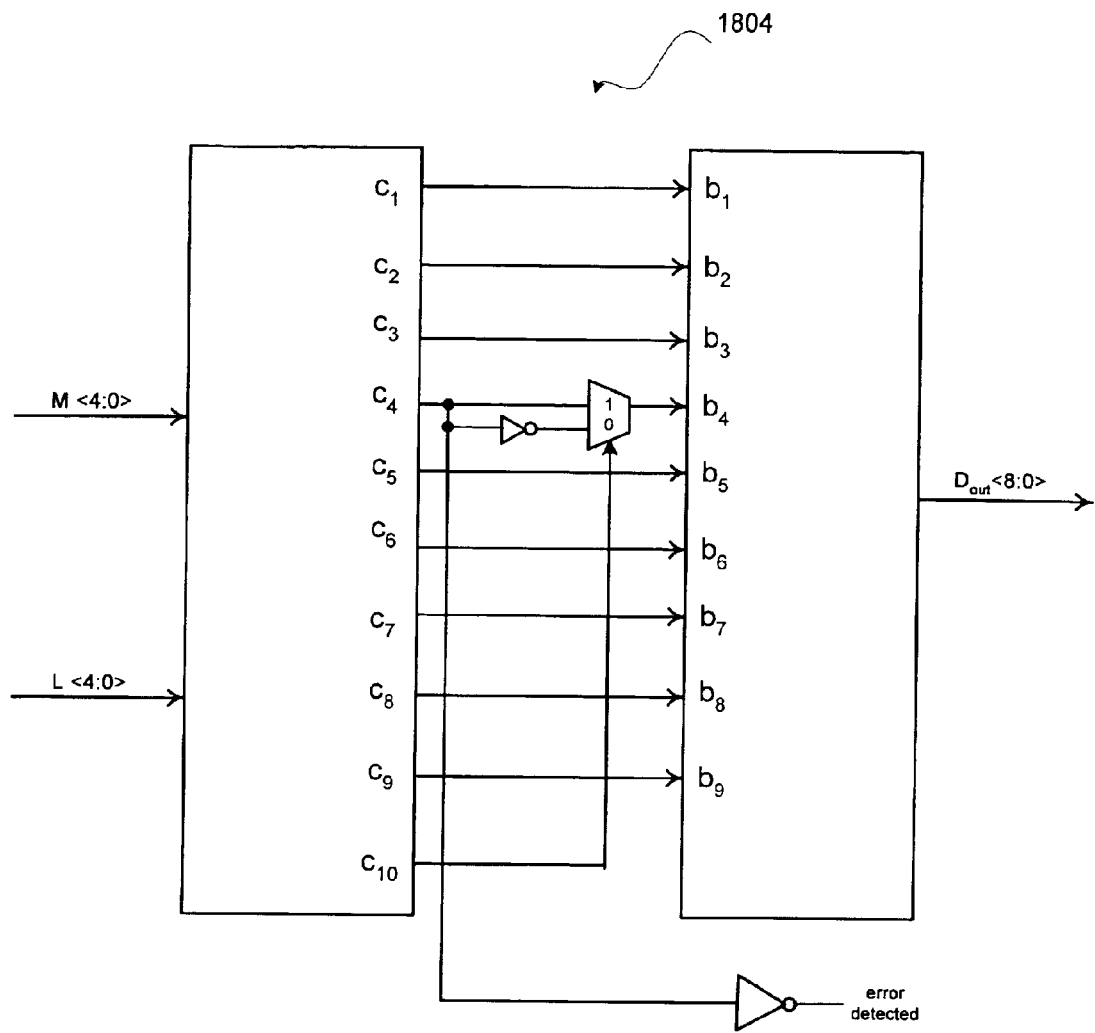
FIG. 20 shows a more detailed view of the 9b10b decoder shown in FIG. 18.

Referring to FIG. 20, there is shown a more detailed view of the 9b10b decoder 1804 of FIG. 18, which corresponds to the encoder 1802 of FIG. 19. As shown in FIG. 20, the 9b10b decoder 1804 receives the MSB codeword (M<4:0>) and the LSB codeword (L<4:0>) so as to recreate the 10-bit codeword (i.e., $c_1, c_2, c_3, c_4, c_5, c_6, c_7, c_8, c_9, c_{10}$). The 9b10b decoder 1804 then decodes the $4^{th}$ (i.e., $c_4$) codeword bit to a logic "0" ("1") value if the received 10-bit codeword has odd (even) parity so as to recreate the uncoded 9-bit word (i.e., $b_1, b_2, b_3, b_4, b_5, b_6, b_7, b_8, b_9$), which is then provided as parallel output data $D_{out}$<8:0>. As shown in FIG. 20, the $4^{th}$ (i.e., $c_4$) codeword bit may be used for error detection by determining if the $4^{th}$ (i.e., $c_4$) codeword bit holds a logic "0" value (or a logic "1" value). In general, if the $4^{th}$ (i.e., $c_4$) codeword bit holds a complement logic value from its corresponding inserted logic value during encoding, then an error is indicated.

The above-described alternative 9b10b transition-limiting code has several characteristic properties. First, the above-described alternative 9b10b transition-limiting code requires only 11% overhead. Second, the above-described alternative 9b10b transition-limiting code eliminates two consecutive full-swing symbol transitions for every three allowed full-swing symbol transitions. Third, the above-described alternative 9b10b transition-limiting code has a unique property wherein the two outer 4-PAM signal levels (i.e., the highest and lowest signal levels) are periodically unused (i.e., there are no transitions starting from or ending with these two outer 4-PAM signal levels). The periodic non-use of these two outer 4-PAM signal levels allows for their alternative use in framing codewords (i.e., identifying the boundary of a codeword), transmitting additional information (i.e., utilizing as spare bandwidth), and detecting errors (i.e., detecting improper signal presence).

Figure 21:
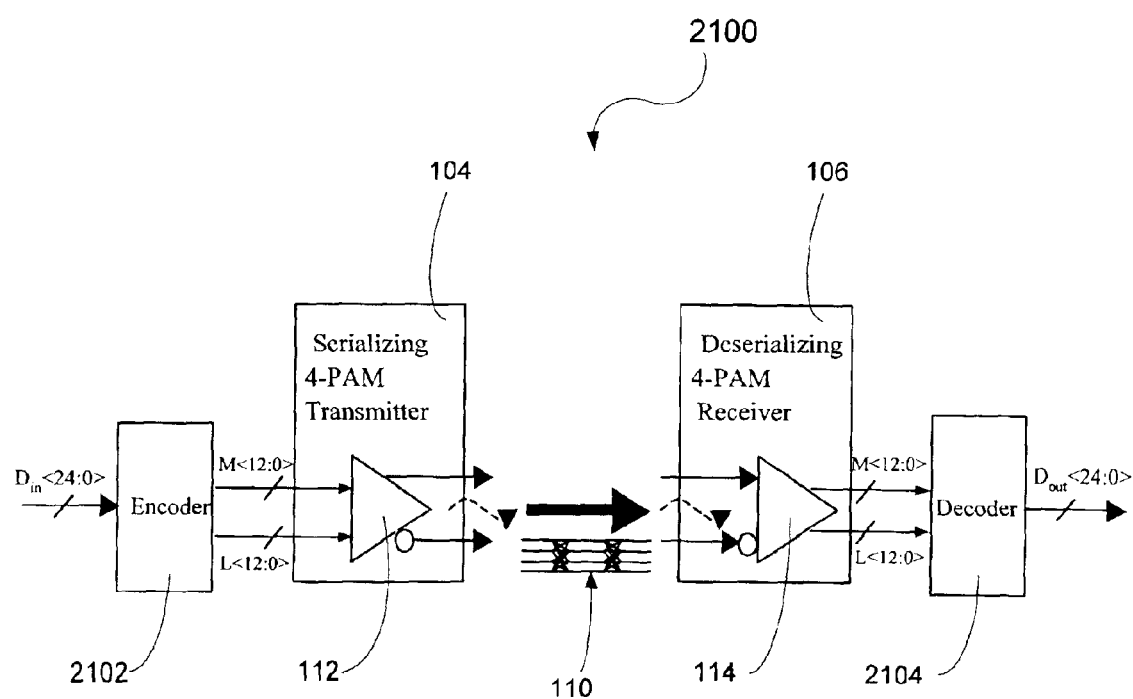
FIG. 21 shows a 4-PAM signaling system configured for implementing a 25b26b transition-limiting code in accordance with an embodiment of the present invention.

Referring to FIG. 21, there is shown a 4-PAM signaling system 2100 configured for implementing a 25b26b transition-limiting code in accordance with an embodiment of the present invention. The system 2100 of FIG. 21 is similar to the system 100 of FIG. 5, except that the system 2100 of FIG. 21 specifically comprises a 25-bit to 26-bit (25b26b) encoder 2102 and a 25-bit from 26-bit (25b26b) decoder 2104 (i.e., a 25b26b codec implementation). The 25b26b transition-limiting code utilized in the 4-PAM signaling system 2100 provides a modified 4-PAM sequence having a reduced number of full-swing transitions.

Similar to FIG. 5, the 25b26b encoder 2102 shown in FIG. 21 receives parallel input data $D_{in}$<24:0>, and then encodes the received parallel input data $D_{in}$<24:0> so as to provide parallel codewords to the serializing 4-PAM transmitter 104 that are organized as MSB codewords (M<12:0>) and LSB codewords (L<12:0>). The MSB codewords (M<12:0>) and the LSB codewords (L<12:0>) together form multiple consecutive symbols. That is, each symbol is formed from a concatenation of an MSB codeword bit (e.g., M<2>) and an LSB codeword bit (e.g., L<2>), thereby forming a bit pair (e.g., {M<2>, L<2>}). The parallel input data $D_{in}$<24:0> is received as a 25-bit word. The MSB codewords (M<12:0>) and the LSB codewords (L<12:0>) each have 13 bits.

Also similar to FIG. 5, the 25b26b decoder 2104 shown in FIG. 21 receives the MSB codewords (M<12:0>) and the LSB codewords (L<12:0>) in parallel form from the deserializing 4-PAM receiver 106, and then decodes the received MSB codewords (M<12:0>) and the received LSB codewords (L<12:0>) so as to provide parallel output data $D_{out}$<24:0>. The received MSB codewords (M<12:0>) and the received LSB codewords (L<12:0>) each have 13 bits. The parallel output data $D_{out}$<24:0> is provided as a 25-bit word.

Figure 22:
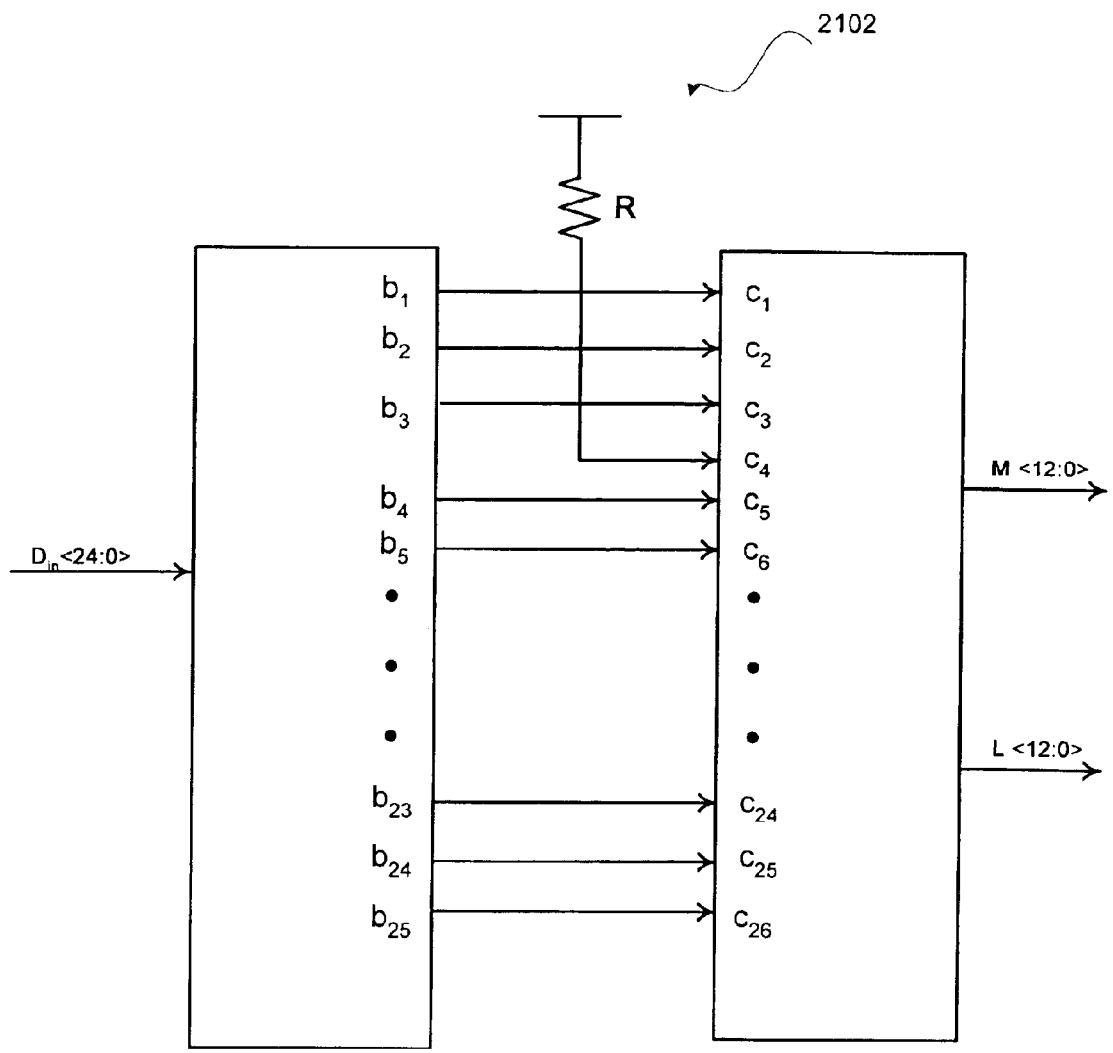
FIG. 22 shows a more detailed view of the 25b26b encoder shown in FIG. 21.

Referring to FIG. 22, there is shown a more detailed view of the 25b26b encoder 2102 of FIG. 21. As shown in FIG. 22, the 25b26b encoder 2102 receives parallel input data $D_{in}$<24:0> as an uncoded 25-bit word (i.e., $b_1$, $b_2$, $b_3$, $b_4$, $b_5$, ... $b_{23}$, $b_{24}$, $b_{25}$). The 25b26b encoder 2102 inserts a logic "1" value after the $3^{rd}$ (i.e., $b_3$) uncoded bit so as to create a 26-bit codeword (i.e., $c_1$, $c_2$, $c_3$, $c_4$, $c_5$, $c_6$, ... $c_{24}$, $c_{25}$, $c_{26}$). The 26-bit codeword is then organized as an MSB codeword (M<12:0>) containing 13 codeword bits (i.e., $c_1$, $c_3$, $c_5$, ... $c_{23}$, $c_{25}$) and an LSB codeword (L<12:0>) containing 13 codeword bits (i.e., $c_2$, $c_4$, $c_6$, ... $c_{24}$, $c_{26}$). As described above, the MSB codeword (M<12:0>) and the LSB codeword (L<12:0>) are then provided to the serializing 4-PAM transmitter 104.

At this point it should be noted that alternate 25b26b encoders may insert a logic value after other ones of the uncoded bits so as to create 26-bit codewords (i.e., $c_1$, $c_2$, $c_3$, $c_4$, $c_5$, $c_6$, ... $c_{24}$, $c_{25}$, $c_{26}$) in accordance with the present invention. That is, alternate 25b26b encoders may insert a logic value after any odd (e.g., $b_5$) uncoded bit. The bit distance between the inserted logic values follows a 26-bit pattern between consecutive codewords. For example, an alternate 25b26b encoder may insert logic values after the $5^{th}$ (i.e., $b_5$) uncoded bit so as to create a 26-bit codeword (i.e., C1, $c_2$, $c_3$, $c_4$, $c_5$, $c_6$, ... $c_{24}$, $c_{25}$, $c_{26}$) in accordance with the present invention.

Figure 23:
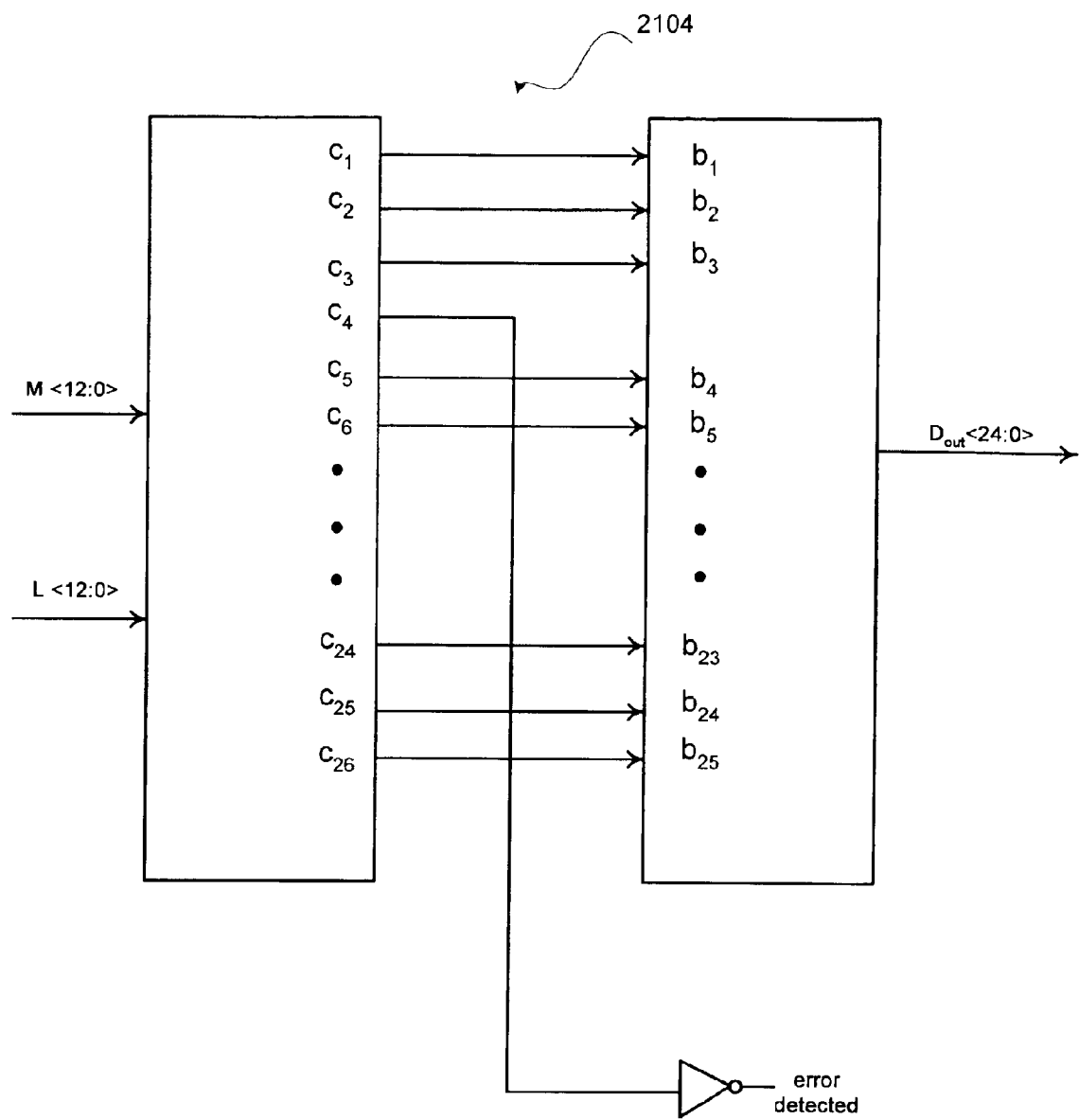
FIG. 23 shows a more detailed view of the 25b26b decoder shown in FIG. 21.

Referring to FIG. 23, there is shown a more detailed view of the 25b26b decoder 2104 of FIG. 21, which corresponds to the encoder 2102 of FIG. 22. As shown in FIG. 23, the 25b26b decoder 2104 receives the MSB codeword (M<12:0>) and the LSB codeword (L<12:0>) so as to recreate the 26-bit codeword (i.e., $c_1$, $c_2$, $c_3$, $c_4$, $c_5$, $c_6$, ... $c_{24}$, $c_{25}$, $c_{26}$). The 25b26b decoder 2104 then removes the $4^{th}$ (i.e., $c_4$) codeword bit so as to recreate the uncoded 25-bit word (i.e., $b_1$, $b_2$, $b_3$, $b_4$, $b_5$, $b_{23}$, $b_{24}$, $b_{25}$), which is then provided as parallel output data $D_{out}$<24:0>. As shown in FIG. 23, the removed codeword bit (i.e., $c_4$) may be used for error detection by determining if the removed codeword bit (i.e., $c_4$) holds a logic "0" value. In general, if the removed codeword bit holds a complement logic value from its corresponding inserted logic value during encoding, then an error is indicated.

The above-described 25b26b transition-limiting code has several characteristic properties. First, the above-described 25b26b transition-limiting code requires only 4% overhead. Second, the above-described 25b26b transition-limiting code reduces the number of full-swing symbol transitions (i.e., for every 11 "allowed" full-swing symbol transition, 2 consecutive full-swing symbol transitions are eliminated). Third, the above-described 25b26b transition-limiting code has a unique property wherein the two outer 4-PAM signal levels (i.e., the highest and lowest signal levels) are periodically unused (i.e., there are no transitions starting from or ending with these two outer 4-PAM signal levels). The periodic non-use of these two outer 4-PAM signal levels allows for their alternative use in framing codewords (i.e., identifying the boundary of a codeword), transmitting additional information (i.e., utilizing as spare bandwidth), and detecting errors (i.e., detecting improper signal presence). Fourth, full-swing symbol transitions between data words may be prevented if a logic "1" value is inserted after the $1^{st}$ (i.e., $b_1$) uncoded bit when creating the 26-bit codeword (i.e., $c_1$, $c_2$, $c_3$, $c_4$, $c_5$, $c_6$, ... $c_{24}$, $c_{25}$, $c_{26}$). An example of a 25b26b transition-limiting code, in accordance with the present invention, is listed in FIG. 28D.

Figure 24:
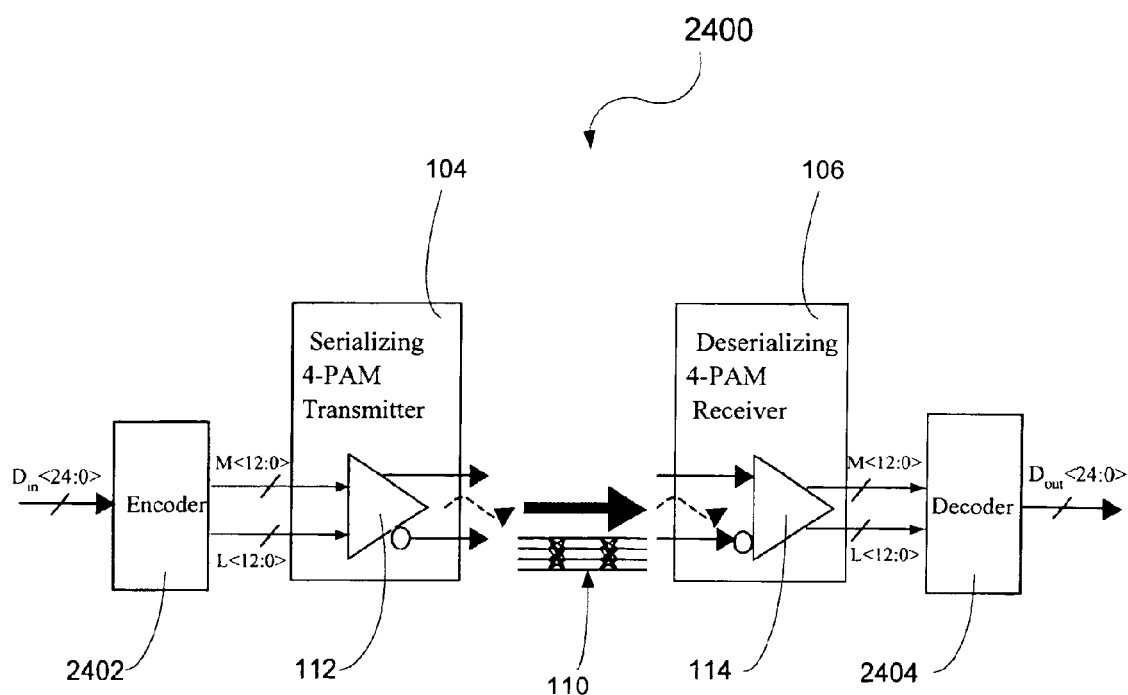
FIG. 24 shows a 4-PAM signaling system configured for implementing an alternative 25b26b transition-limiting code in accordance with an embodiment of the present invention.

Referring to FIG. 24, there is shown a 4-PAM signaling system 2400 configured for implementing an alternative 25b26b transition-limiting code in accordance with an embodiment of the present invention. The system 2400 of FIG. 24 is similar to the system 100 of FIG. 5, except that the system 2400 of FIG. 24 specifically comprises a 25-bit to 26-bit (25b26b) encoder 2402 and a 25-bit from 26-bit (25b26b) decoder 2404 (i.e., a 25b26b codec implementation). The 25b26b transition-limiting code utilized in the 4-PAM signaling system 2400 provides a modified 4-PAM sequence having a reduced number of full-swing transitions.

Similar to FIG. 5, the 25b26b encoder 2402 shown in FIG. 24 receives parallel input data $D_{in}<24:0>$, and then encodes the received parallel input data $D_{in}<24:0>$ so as to provide parallel codewords to the serializing 4-PAM transmitter 104 that are organized as MSB codewords (M<12:0>) and LSB codewords (L<12:0>). The MSB codewords (M<12:0>) and the LSB codewords (L<12:0>) together form multiple consecutive symbols. That is, each symbol is formed from a concatenation of an MSB codeword bit (e.g., M<2>) and an LSB codeword bit (e.g., L<2>), thereby forming a bit pair (e.g., {M<222 , L<2>}). The parallel input data $D_{in}<24:0>$ is received as a 25-bit word. The MSB codewords (M<12:0>) and the LSB codewords (L<12:0>) each have 13 bits.

Also similar to FIG. 5, the 25b26b decoder 2404 shown in FIG. 24 receives the MSB codewords (M<12:0>) and the LSB codewords (L<12:0>) in parallel form from the deserializing 4-PAM receiver 106, and then decodes the received MSB codewords (M<12:0>) and the received LSB codewords (L<12:0>) so as to provide parallel output data $D_{out}<24.:0>$. The received MSB codewords (M<12:0>) and the received LSB codewords (L<12:0>) each have 13 bits. The parallel output data $D_{out}<24:0>$ is provided as a 25-bit word.

Figure 25:
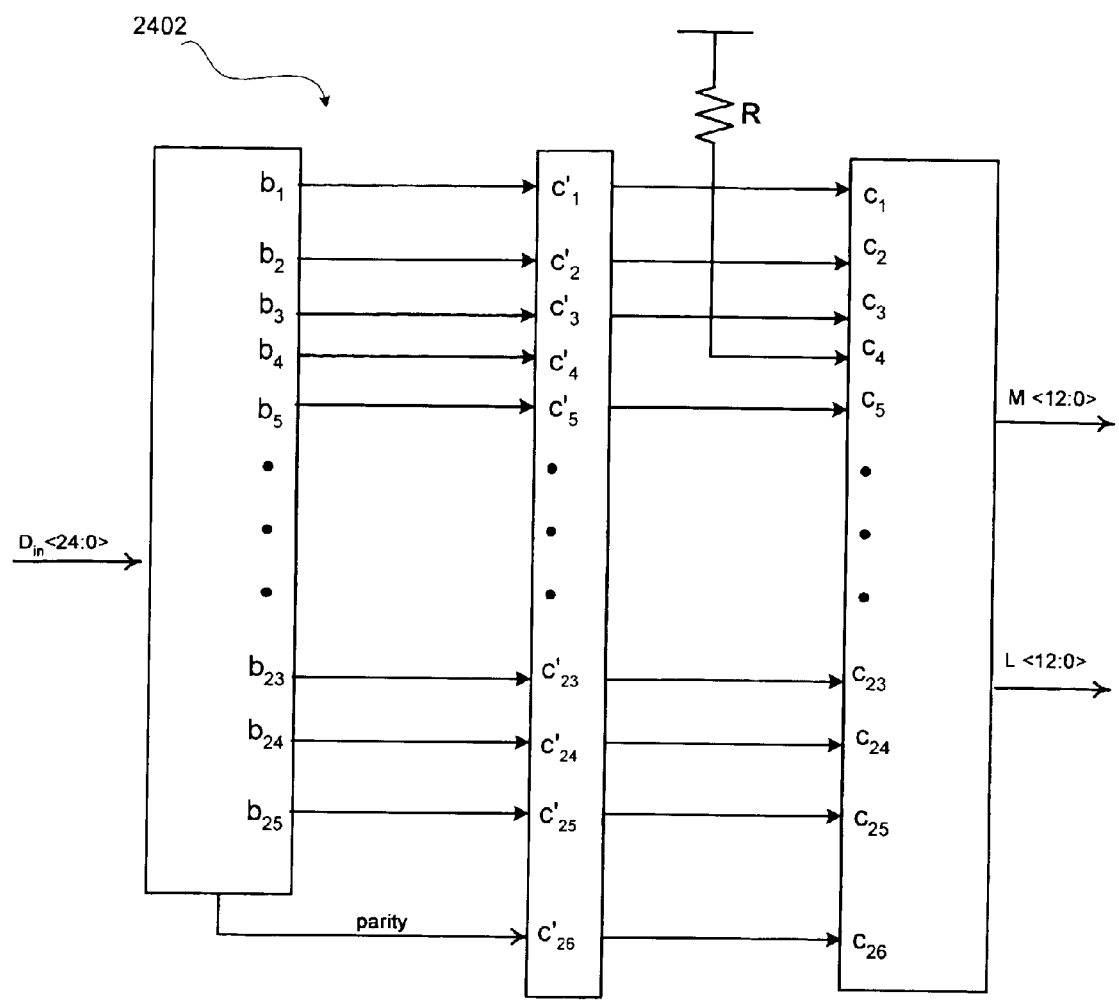
FIG. 25 shows a more detailed view of the 25b26b encoder shown in FIG. 24.

Referring to FIG. 25, there is shown a more detailed view of the 25b26b encoder 2402 of FIG. 24. As shown in FIG. 25, the 25b26b encoder 2402 receives parallel input data $D_{in}<24:0>$ as an uncoded 25-bit word (i.e., $b_1, b_2, b_3, b_4, b_5, \ldots b_{23}, b_{24}, b_{25}$). The 25b26b encoder 2402 adds an even (odd) parity bit (i.e., $c'_{26}$) so as to create a 26-bit intermediate word (i.e., $C'_1, C'_2, C'_3, C'_4, c'_5, c'_6, \ldots C'_{24}, c'_{25}, c'_{26}$), and then sets the $4^{th}$ (i.e., $b_4$ or $C'_4$) uncoded bit to a logic "1" value (or a logic "0" value) so as to create a 26-bit codeword (i.e., $c_1, c_2, c_3, c_4, c_5, c_6, \ldots c_{24}, c_{25}, c_{26}$). The 26-bit codeword is then organized as an MSB codeword (M<12:0>) containing 13 codeword bits (i.e., $c_1, c_3, c_5, \ldots c_{23}, c_{25}$) and an LSB codeword (L<12:0>) containing 13 codeword bits (i.e., $c_2, c_4, c_6, \ldots c_{24}, c_{26}$). As described above, the MSB codeword (M<12:0>) and the LSB codeword (L<12:0>) are then provided to the serializing 4-PAM transmitter 104.

At this point it should be noted that the 25b26b encoder 2402 may alternatively insert a logic "1" value (or a logic "0" value) for the $2^{nd}$ (i.e., $b_2$) uncoded bit so as to create the 26-bit codeword (i.e., $c_1, c_2, c_3, c_4, c_5, c_6, \ldots c_{24}, c_{25}, c_{26}$) in accordance with the present invention.

Figure 26:
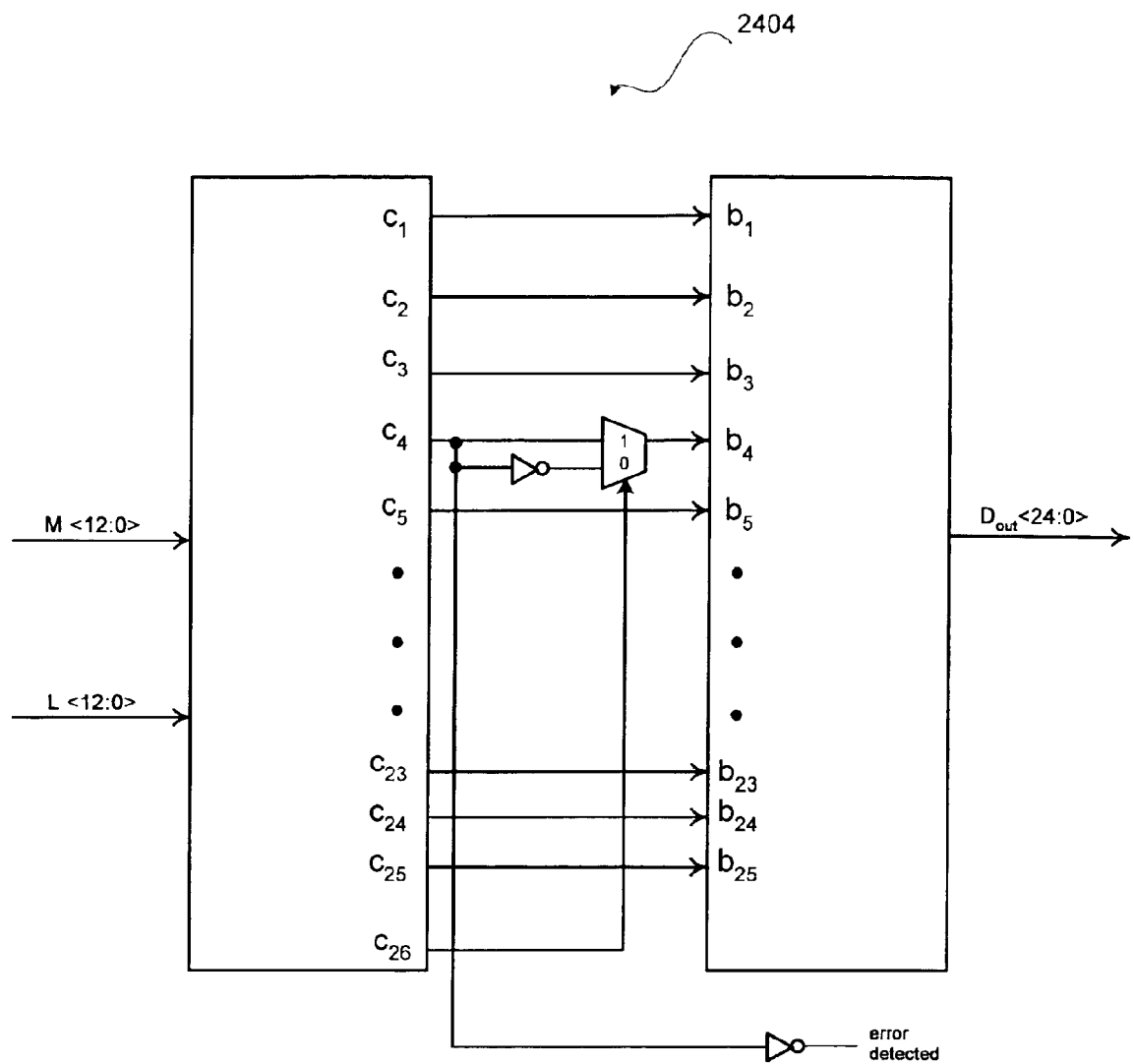
FIG. 26 shows a more detailed view of the 25b26b decoder shown in FIG. 24.

Referring to FIG. 26, there is shown a more detailed view of the 25b26b decoder 2404 of FIG. 24. As shown in FIG. 26, the 25b26b decoder 2404 receives the MSB codeword (M<12:0>) and the LSB codeword (L<12:0>) so as to recreate the 26-bit codeword (i.e., $c_1, c_2, c_3, c_4, c_5, c_6, \ldots c_{24}, c_{25}, c_{26}$). The 25b26b decoder 2404 then decodes the $4^{th}$ (i.e., $c_4$) codeword bit to a logic "0" ("1") value if the received 26-bit codeword has odd (even) parity so as to recreate the uncoded 25-bit word (i.e., $b_1, b_2, b_3, b_4, b_5, \ldots b_{23}, b_{24}, b_{25}$), which is then provided as parallel output data $D_{out}<24:0>$. As shown in FIG. 26, the $4^{th}$ (i.e., $c_4$) codeword bit may be used for error detection by determining if the $4^{th}$ (i.e., $c_4$) codeword bit holds a logic "0" value (or a logic "1" value). In general, if the removed codeword bit holds a complement logic value from its corresponding inserted logic value during encoding, then an error is indicated.

The above-described alternative 25b26b transition-limiting code has several characteristic properties. First, the above-described alternative 25b26b transition-limiting code requires only 4% overhead. Second, the above-described alternative 25b26b transition-limiting code reduces the number of full-swing symbol transitions. Third, the above-described alternative 25b26b transition-limiting code has a unique property wherein the two outer 4-PAM signal levels (i.e., the highest and lowest signal levels) are periodically unused (i.e., there are no transitions starting from or ending with these two outer 4-PAM signal levels). The periodic non-use of these two outer 4-PAM signal levels allows for their alternative use in framing codewords (i.e., identifying the boundary of a codeword), transmitting additional information (i.e., utilizing as spare bandwidth), providing a DC voltage balancing property to the transition-limiting code, and detecting errors (i.e., detecting improper signal presence).

At this point it should be noted that all of the above-described parity based 4-PAM coding schemes, as well as other alternative parity based 4-PAM coding schemes not described above, may be generalized such that an odd or even parity bit may be added at any bit location of an uncoded word so as to create an intermediate word, and any even bit location of the intermediate word may be set to either a logic "1" or logic "0" value so as to create a codeword.

Figure 27:
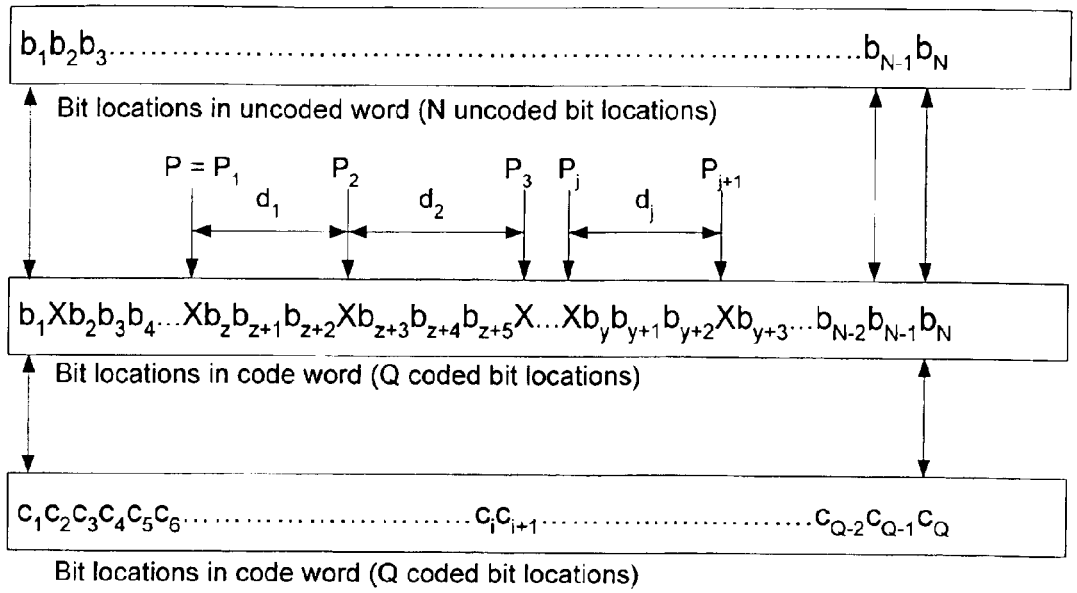
FIG. 27 depicts the bit positions of bits in an uncoded word along with the bit positions of bits inserted into the uncoded word to form a coded word.

At this point it should be noted that all of the above-described non-parity based 4-PAM coding schemes, as well as other alternative non-parity based 4-PAM coding schemes not described above, may be generalized according to the code rates of the coding schemes used therein. For example, FIGS. 28A, 28B and 28C each contain a table listing a series of transition-limiting coding schemes or codes along with the code construction rules and selected parameters associated with each code. FIG. 28D contains a table listing examples of codes with the code construction rules and selected code parameters. FIG. 27 depicts a codeword containing Q bits, and description of some of the variables used in the code construction rules of FIGS. 28A, 28B and 28C, and in the examples listed in FIG. 28D. Each of the codes listed on FIG. 28A has a code length Q of B. Each of the codes listed on FIG. 28B has a codelength Q of 2B. Each of the codes listed on FIG. 28C has a codelength Q of 4B. The codes in FIGS. 28A, 28B, 28C and 28D can be used in 4-PAM signaling systems in accordance with the present invention.

At this point it should be noted that, although only 4-PAM signaling systems have been discussed above, the present invention is not limited in this regard. That is, the present invention encompasses other types of signaling systems that utilize more than two signal levels, as described in detail below.

Figure 29:
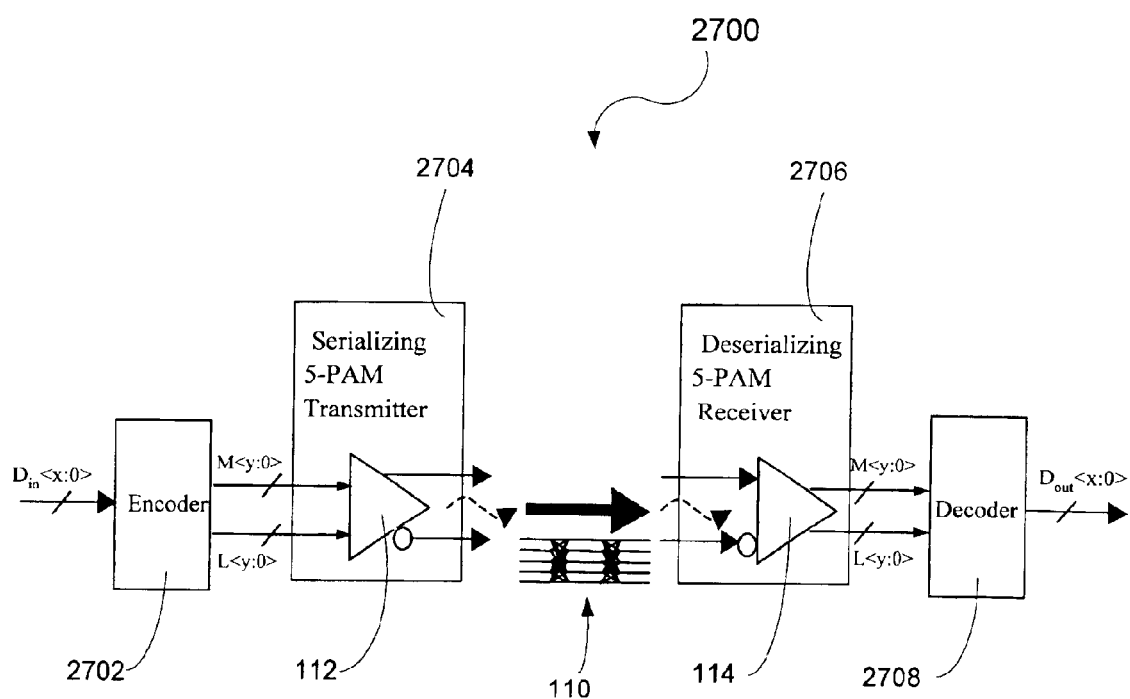
FIG. 29 shows a 5-PAM signaling system for supporting a technique for improving the quality of digital signals in a multi-level signaling system in accordance with the present invention.

Referring to FIG. 29, there is shown a 5-PAM signaling system 2700 comprising an encoder 2702, a serializing 5-PAM transmitter 2704, a deserializing 5-PAM receiver 2706, and a decoder 2708. The serializing 5-PAM transmitter 2704 and the deserializing 5-PAM receiver 2706 are interconnected by a pair of signal carrying conductors 110.

The encoder 2702 receives parallel input data Din, and then encodes the received parallel input data Din so as to provide parallel codewords to the serializing 5-PAM transmitter 2704 that are organized as MSB codewords (M) and LSB codewords (L). The MSB codewords (M) and the LSB codewords (L) together form multiple consecutive symbols. That is, each symbol is formed from a concatenation of an MSB codeword bit (i.e., M<m>) and an LSB codeword bit (i.e., L<n>), thereby forming a bit pair {M<m>, L<n>} The parallel input data $D_{in}$ is received as a word having x+1 bits. The MSB codewords (M) and the LSB codewords (L) each have y+1 bits. The encoder 2702 may be implemented with traditional binary logic.

The serializing 5-PAM transmitter 2704 receives the MSB codewords (M) and the LSB codewords (L) in parallel form from the encoder 2702. The serializing 5-PAM transmitter 2704 comprises a differential transmitter 112 for differentially serially transmitting the received multiple consecutive symbols in the MSB codewords (M) and the LSB codewords (L) over the pair of signal carrying conductors 110 to the deserializing 5-PAM receiver 2706.

The deserializing 5-PAM receiver 2706 comprises a differential receiver 114 for differentially serially receiving the multiple consecutive symbols in the MSB codewords (M) and the LSB codewords (L) over the pair of signal carrying conductors 110 from the serializing 5-PAM transmitter 2704. The differential receiver 114 then transmits. the MSB codewords (M) and the LSB codewords (L) in parallel form to the decoder 2708.

The decoder 2708 is essentially the inverse of the encoder 2702. That is, the decoder 2708 receives the MSB codewords (M) and the LSB codewords (L) in parallel form from the deserializing 5-PAM receiver 2706, and then decodes the received MSB codewords (M) and the received LSB codewords (L) so as to provide parallel output data $D_{out}$. The parallel output data $D_{out}$ is provided as a word having x+1 bits. The decoder 2708 may be implemented with traditional binary logic.

At this point it should be noted that, while FIG. 29 shows the serializing 5-PAM transmitter 2704 as having the differential transmitter 112 and the deserializing 5-PAM receiver 2706 as having the differential receiver 114, the present invention is not limited in this regard. That is, the MSB codewords (M) and the LSB codewords (L) may be transmitted from the serializing 5-PAM transmitter 2704 to the deserializing 5-PAM receiver 2706 in a single-ended manner requiring only a single-ended transmitter and a single-ended receiver. Thus, the serializing 5-PAM transmitter 2704 and the deserializing 5-PAM receiver 2706 may alternatively be interconnected by a single signal carrying conductor instead of the pair of signal carrying conductors 110. Alternatively still, in an optical based system, the serializing 5-PAM transmitter 2704 and the deserializing 5-PAM receiver 2706 may be interconnected by an optical fiber capable carrying signals at multiple optical signal levels.

Referring to FIG. 30, there is shown a table containing mappings from uncoded bit pairs to coded symbols for two different 5-PAM transition limiting codes (i.e., C-PAM5.1 and CPAM5.2) in accordance with the present invention. For purposes of understanding the present invention, assume that the 5-PAM signaling system 2700 of FIG. 29 has five signal levels represented by unitless normalized signal levels +3, +1.5, 0, −1.5, and −3. Thus, the variable "a" in the table of FIG. 30 represents the unitless normalized signal level of 1.5. of course, the present invention is not limited in this regard as the signal levels in the 5-PAM signaling system 2700 of FIG. 29 may be associated with many different combinations of signal levels.

In both of the two different 5-PAM transition limiting codes (i.e., C-PAM5.1 and C-PAM5.2), both current uncoded bit pairs (i.e., bit pair $\{b_1^{(k)}, b_0^{(k)}\}$, wherein k=1, 2, 3, . . . ) and previous uncoded bit pairs (i.e., bit pair $\{b_1^{(k-1)}, b_0^{(k-1)}\}$, wherein k=1, 2, 3, . . . ) are required to determine both current coded symbols (i.e., symbol $s^{(k)}$, wherein k=1, 2, 3, . . . ) and previous coded symbols (i.e., symbol $s^{(k-1)}$, wherein k=1, 2, 3, . . . ).

Figure 31:
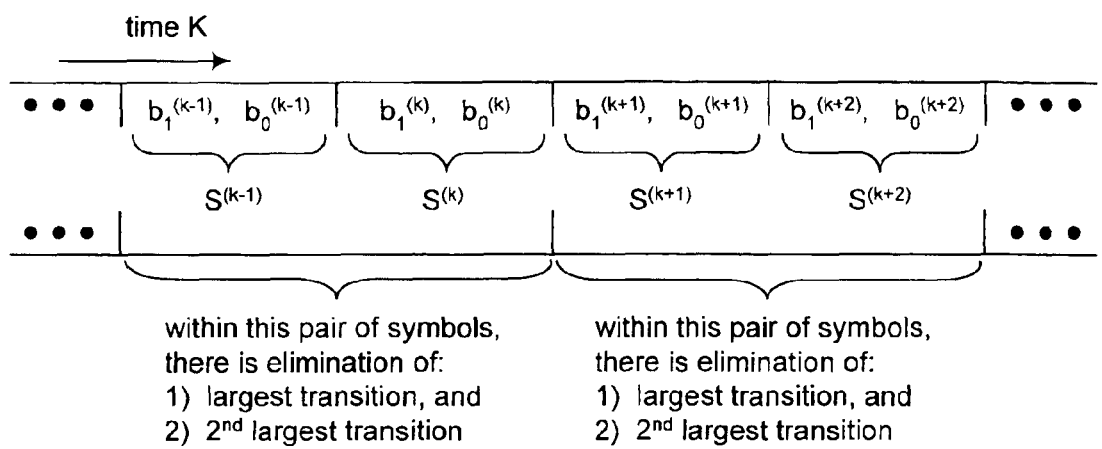
FIG. 31 shows a timing diagram detailing how coded symbols are formed from uncoded bit pairs for two different 5-PAM transition limiting codes (i.e., C-PAM5.1 and C-PAM5.2) in accordance with the present invention.

Referring to FIG. 31, there. is shown a timing diagram detailing how coded symbols are formed from uncoded bit pairs for the two different 5-PAM transition limiting codes (i.e., C-PAM5.1 and C-PAM5.2) in accordance with the present invention. FIG. 31 also indicates that the largest transition and the second largest transition are eliminated in non-overlapping consecutive symbol pairs for the two different 5-PAM transition limiting codes (i.e., C-PAM5.1 and C-PAM5.2) in accordance with the present invention. In other words, for both of the two different 5-PAM transition limiting codes (i.e., C-PAM5.1 and CPAM5.2), the largest symbol transition and the second largest symbol transition are eliminated every other clock cycle. Assuming the above-mentioned signal levels, the symbol transitions that are eliminated in both of the two different 5-PAM transition limiting codes (i.e., C-PAM5.1 and C-PAM5.2) include the +3 to/from −3 symbol transition, the +3 to/from −1.5 symbol transition, and the —3 to/from +1.5 symbol transition. Of course, the present invention is not limited in this regard.

Analogous to the 4-PAM transition limiting codes described above, both of the two different S-PAM transition limiting codes (i.e., C-PAM5.1 and C-PAM5.2) have a unique property wherein certain symbol transitions are not used. For example, in the first 5-PAM transition limiting code (i.e., C-PAM5.1), the 0 to −3 symbol transition, the −3 to 0 symbol transition, and the 3 to 0 symbol transition are not used. Also, for example, in the second 5-PAM transition limiting code (i.e., C-PAM5.2 ), the 0 to 0 symbol transition, the −3 to 0 symbol transition, and the 3 to 0 symbol transition are not used. The non-use of these symbol transitions allows for their alternative use in framing codewords (i.e., identifying the boundary of a codeword), transmitting additional information (i.e., utilizing as spare bandwidth), and detecting errors (i.e., detecting improper signal presence).

Referring to FIG. 32, there is shown a table containing mappings from uncoded bit pairs to coded symbols for two different 5-PAM transition limiting codes (i.e., C-PAM5.1 and CPAM5.2) when both utilizing and not utilizing unused symbol transitions as spare bandwidth in accordance with the present invention. Referring to FIG. 33, there is shown a table containing only the specific cases wherein the two different 5-PAM transition limiting codes (i.e., C-PAM5.1 and C-PAM5.2) utilize unused symbol transitions as spare bandwidth in accordance with the present invention. Referring to FIG. 34, there is shown a table containing only the specific cases wherein the two different 5-PAM transition limiting codes (i.e., C-PAM5.1 and C-PAM5.2) utilize unused symbol transitions for error detection, as well as spare bandwidth, in accordance with the present invention.

The second 5-PAM transition limiting code (i.e., C-PAM5.2) has an advantage over the first 5-PAM transition limiting code (i.e., C-PAM5.1) in that the second 5-PAM transition limiting code (i.e., C-PAM5.2) does not use the 0 to 0 symbol transition, thereby always allowing for "good" CDR transitions wherein the signal crossing point is geometrically centered between symbols.

Referring to FIG. 35 there is shown a table containing a mapping from uncoded symbols into coded symbols for eliminating the largest transition and the second largest transition in overlapping consecutive symbol pairs in the 5-PAM signaling system 2700 of FIG. 29 in accordance with the present invention.

Referring to FIGS. 36A and 36B there are shown tables containing mappings from uncoded bit pairs to coded symbols for an alternative 5-PAM transition limiting code (i.e., C-PAM5.3) in accordance with the present invention. In this alternative 5-PAM transition limiting code (i.e., C-PAM5.3), the mapping shown in FIG. 35 is utilized to eliminate 100% of the largest symbol transitions (i.e., the +3 to/from −3 symbol transitions) and 50% of the second largest symbol transitions (i.e., the +3 to/from −1.5 symbol transitions, and the −3 to/from +1.5 symbol transitions) in consecutive symbol pairs in the 5-PAM signaling system 2700 of FIG. 29 in accordance with the present invention.

As shown in FIGS. 36A and 36B, in the alternative 5-PAM transition limiting code (i.e., C-PAM5.3), there is a latency period of one symbol during encoding and a variable latency period during decoding. That is, during encoding, a current uncoded bit pair (e.g., bit pair $\{b_1^{(k)}, b_0^{(k)}\}$, wherein k=1, 2, 3, . . . ) is required to determine a previous coded symbol (e.g., symbol $s^{(k-1)}$, wherein k=1, 2, 3, . . . ). In contrast, during decoding, a current coded symbol (e.g., symbol $s^{(k)}$, wherein k=1, 2, 3, . . . ) having a non-zero value is required to determine the original uncoded value of a previous coded symbol (e.g., symbol $s^{(k-s)}$, wherein k=1, 2, 3, . . . ).

At this point it should be noted that the future symbol (i.e., symbol $s^{(k+1)}$, wherein k=1, 2, 3, . . . ) shown in FIGS. 36A and 36B has not yet been encoded, but is shown only for the purpose of showing the value of the current coded symbol (e.g., symbol $s^{(k)}$, wherein k=1, 2, 3, . . . ) since, as described above, the value of this future symbol (i.e., symbol $s_s^{(k+1)}$, wherein k=1, 2, 3, . . . ) is required to determine the value of the current coded symbol (e.g., symbol $s^{(k)}$, wherein k=1, 2, 3, . . . ).

Figure 37:
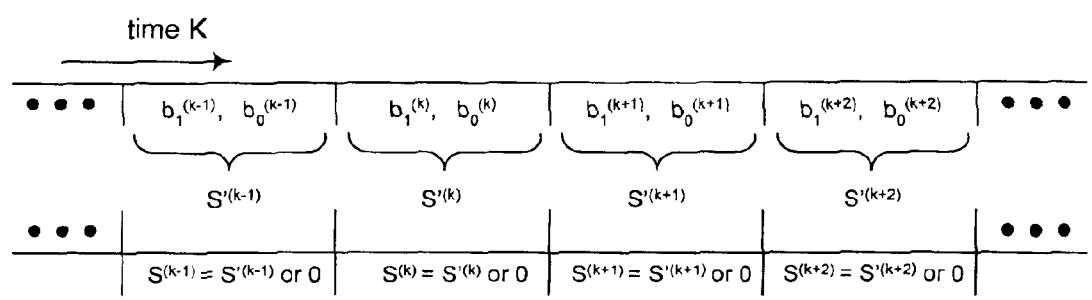
FIG. 37 shows a timing diagram detailing how coded symbols are formed from uncoded bit pairs for the alternative 5-PAM transition limiting code (i.e., C-PAM5.3) in accordance with the present invention.

Referring to FIG. 37, there is shown a timing diagram detailing how coded symbols (e.g., $s^{(k)}$) are formed from uncoded bit pairs for the alternative 5-PAM transition limiting code (i.e., C-PAM5.3) in accordance with the present invention. FIG. 37 also indicates that each coded symbol (e.g., $s^{(k)}$) has a value of either 0 volts or that of a corresponding original uncoded symbol (e.g., $s'^{(k)}$), It is possible to reduce the variable latency period for decoding the alternative 5-PAM transition limiting code (i.e., C-PAM5.3) to one symbol. This may be accomplished by setting a flag (M) to logic "1" whenever the alternative 5-PAM transition limiting code (i.e., C-PAM5.3) operates to eliminate one of the largest symbol transitions (i.e., the +3 to/from −3 symbol transitions) or to reduce one of the second largest symbol transitions (i.e., the +3 to/from −1.5 symbol transitions, and the −3 to/from +1.5 symbol transitions) for a current uncoded bit pair (e.g., bit pair $\{b_1^{(k)}, b_0^{(k)}\}$, wherein k=1, 2, 3, . . . ). If, for a next subsequent bit pair (e.g., bit pair $\{b_1^{(k+1)}, b_0^{(k+1)}\}$, wherein k=1, 2, 3, . . . ), there is no need to eliminate one of the largest symbol transitions or to reduce one of the second largest symbol transitions, then reset the flag (M) to logic "0". However, if, for a next subsequent bit pair (e.g., bit pair $\{b_1^{(k+1)}, b_0^{(k+1)}\}$, wherein k=1, 2, 3, . . . ), despite the fact that there is a need to eliminate one of the largest symbol transitions or to reduce one of the second largest symbol transitions, do not eliminate one of the largest symbol transitions or reduce one of the second largest symbol transitions since the flag (M) is set to logic "1".

Figure 38:
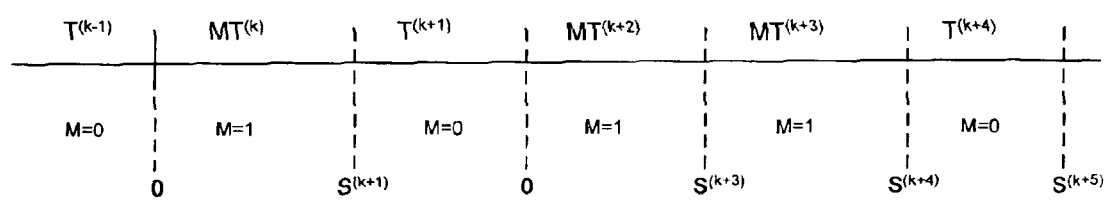
FIG. 38 shows a timing diagram detailing a technique for reducing a variable latency period for decoding the alternative 5-PAM transition limiting code (i.e., C-PAM5.3) to one symbol in accordance with the present invention.

Referring to FIG. 38, there is shown a timing diagram detailing the above-described technique for reducing the variable latency period for decoding the alternative 5-PAM transition limiting code (i.e., C-PAM5.3) to one symbol. In FIG. 38, T represents a symbol transition (i.e., not a largest symbol transition or a second largest symbol transition) that does not need to be replaced with a smaller symbol transition, MT represents a symbol transition (i.e., a largest symbol transition or a second largest symbol transition) that needs to be replaced with a smaller symbol transition, and M represents the flag that is set when a symbol transition is replaced with a smaller symbol transition.

The spare bandwidth available in 4-PAM signaling systems using the coding schemes of the present invention which utilize bit insertion to achieve full swing elimination or full swing reduction may be used, for example, for achieving DC balance, framing codewords, detecting errors, transmitting information over a backchannel, etc. At this point it should be noted that improving the quality of transmitted digital signals in accordance with the present invention as described above may involve the processing of input data and the generation of output data to some extent. This input data processing and output data generation may be implemented in hardware or software. For example, as described above, specific electronic components may be employed in an encoder, decoder, or other similar or related circuitry for implementing the functions associated with improving the quality of transmitted digital signals in accordance with the present invention as described above. Alternatively, one or more processors operating in accordance with stored instructions may implement the functions associated with improving the quality of transmitted digital signals in accordance with the present invention as described above. If such is the case, it is within the scope of the present invention that such instructions may be stored on one or more processor readable carriers (e.g., a magnetic disk), or transmitted to one or more processors via one or more signals.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for improving the quality of transmitted digital signals in a multi-level signaling system wherein digital signals representing more than one bit of information may be transmitted at more than two signal levels on a single transmission medium, the method comprising the step of:

encoding digital values represented by sets of N bits to provide corresponding sets of P symbols, each set of P symbols being formed to reduce full-swing transitions between successive digital signal transmissions.

2. The method as defined in claim 1, wherein each set of P symbols is formed with Q bits, wherein Q is greater than N.

3. The method as defined in claim 2, wherein N=8 and Q=10.

4. The method as defined in claim 2, wherein N=10 and Q=12.

5. The method as defined in claim 2, wherein N=16 and Q=20.

6. The method as defined in claim 2, wherein N=9 and Q=10.

7. The method as defined in claim 2, wherein N=25 and Q=26.

8. The method as defined in claim 1, wherein digital signals may be transmitted at four signal levels on a single transmission medium.

9. The method as defined in claim 1, wherein digital signals may be transmitted at five signal levels on a single transmission medium.

10. The method as defined in claim 1, wherein the single transmission medium comprises a single electrical conductor.

11. The method as defined in claim 1, wherein the single transmission medium comprises a differential pair of electrical conductors.

12. The method as defined in claim 1, wherein the single transmission medium comprises an optical fiber.

13. The method as defined in claim 1, wherein each symbol represents two bits.

14. The method as defined in claim 1, wherein each set of P symbols includes at least one transition that is substantially geometrically centered.

15. The method as defined in claim 1, wherein a particular symbol in each set of P symbols is formed to ensure that undesirable transitions do not occur between neighboring sets of P symbols.

16. The method as defined in claim 1, wherein the step of encoding comprises adding at least one bit having a fixed bit value to the N bits to generate each set of P symbols.

17. The method as defined in claim 1, wherein the step of encoding comprises the steps of:

adding a parity bit to the N bits; and substituting at least one bit having a fixed bit value for at least one of the N bits to generate each set of P symbols.

18. The method as defined in claim 1, wherein the step of encoding comprises the step of:

forming pairs of symbols in each set of P symbols based upon the value of corresponding pairs of bits in the N bits.

19. The method as defined in claim 1, further comprising the steps of:

transmitting the sets of P symbols;

receiving the transmitted sets of P symbols; and decoding the digital values represented by the sets of N bits from the transmitted sets of P symbols.

20. The method as defined in claim 1, wherein each set of P symbols is formed to eliminate full-swing transitions between at least every other successive digital signal transmission.

21. The method as defined in claim 1, wherein each set of P symbols is formed to eliminate non-full-swing transitions between at least every other successive digital signal transmission.

22. A method for improving the quality of transmitted digital signals in a multi-level signaling system wherein digital signals representing more than one bit of information may be transmitted at more than two signal levels on a single transmission medium, the method comprising the step of:

encoding digital values represented by sets of N bits to provide corresponding sets of P symbols, each set of P symbols being formed to reduce non-full-swing transitions between successive digital signal transmissions.

23. The method as defined in claim 22, wherein each set of P symbols is also formed to eliminate full-swing transitions between successive digital signal transmissions.

24. The method as defined in claim 22, wherein the step of encoding comprises the step of:

forming each symbol in each set of P symbols based upon the value of a corresponding pair of bits in the N bits.

25. The method as defined in claim 24, wherein the step of encoding further comprises the step of:

forming each symbol in each set of P symbols based upon the value of at least subsequently encoded pair of bits.

26. An apparatus for improving the quality of transmitted digital signals in a multi-level signaling system wherein digital signals representing more than one bit of information may be transmitted at more than two signal levels on a single transmission medium, the apparatus comprising:

an encoder that encodes digital values represented by sets of N bits to provide corresponding sets of P symbols, each set of P symbols being formed to reduce full-swing transitions between successive digital signal transmissions.

27. The apparatus as defined in claim 26, wherein each set of P symbols is formed with Q bits, wherein Q is greater than N.

28. The apparatus as defined in claim 27, wherein N=8 and Q=10.

29. The apparatus as defined in claim 27, wherein N=10 and Q=12.

30. The apparatus as defined in claim 27, wherein N=16 and Q=20.

31. The apparatus as defined in claim 27, wherein N=9 and Q=10.

32. The apparatus as defined in claim 27, wherein N=25 and Q=26.

33. The apparatus as defined in claim 26, wherein digital signals may be transmitted at four signal levels on a single transmission medium.

34. The apparatus as defined in claim 26, wherein digital signals may be transmitted at five signal levels on a single transmission medium.

35. The apparatus as defined in claim 26, wherein the single transmission medium comprises a single electrical conductor.

36. The apparatus as defined in claim 26, wherein the single transmission medium comprises a differential pair of electrical conductors.

37. The apparatus as defined in claim 26, wherein the single transmission medium comprises an optical fiber.

38. The apparatus as defined in claim 26, wherein each symbol represents two bits.

39. The apparatus as defined in claim 26, wherein each set of P symbols includes at least one transition that is substantially geometrically centered.

40. The apparatus as defined in claim 26, wherein a particular symbol in each set of P symbols is formed to ensure that undesirable transitions do not occur between neighboring sets of P symbols.

41. The apparatus as defined in claim 26, wherein the encoder adds at least one bit having a fixed bit value to the N bits to generate each set of P symbols.

42. The apparatus as defined in claim 26, wherein the encoder adds a parity bit to the N bits and substitutes at least one bit having a fixed bit value for at least one of the N bits to generate each set of P symbols.

43. The apparatus as defined in claim 26, wherein the encoder forms pairs of symbols in each set of P symbols based upon the value of corresponding pairs of bits in the N bits.

44. The apparatus as defined in claim 26, further comprising:
- a transmitter that transmits the sets of P symbols;
- a receiver that receives the transmitted sets of P symbols; and
- a decoder that decodes the digital values represented by the sets of N bits from the transmitted sets of P symbols.

45. The apparatus as defined in claim 26, wherein each set of P symbols is formed to eliminate full-swing transitions between at least every other successive digital signal transmission.

46. The apparatus as defined in claim 26, wherein each set of P symbols is formed to eliminate non-full-swing transitions between at least every other successive digital signal transmission.

47. An apparatus for improving the quality of transmitted digital signals in a multi-level signaling system wherein digital signals representing more than one bit of information may be transmitted at more than two signal levels on a single transmission medium, the apparatus comprising:
- means for encoding digital values represented by sets of N bits to provide corresponding sets of P symbols, each set of P symbols being formed to reduce full-swing transitions between successive digital signal transmissions.

48. An apparatus for improving the quality of transmitted digital signals in a multi-level signaling system wherein digital signals representing more than one bit of information may be transmitted at more than two signal levels on a single transmission medium, the apparatus comprising:
- an encoder that encodes digital values represented by sets of N bits to provide corresponding sets of P symbols, each set of P symbols being formed to reduce non-full-swing transitions between successive digital signal transmissions.

49. The apparatus as defined in claim 48, wherein each set of P symbols is also formed to eliminate full-swing transitions between successive digital signal transmissions.

50. The apparatus as defined in claim 48, wherein the encoder forms each symbol in each set of P symbols based upon the value of a corresponding pair of bits in the N bits.

51. The apparatus as defined in claim 50, wherein the encoder also forms each symbol in each set of P symbols based upon the value of at least subsequently encoded pair of bits.

52. An apparatus for improving the quality of transmitted digital signals in a multi-level signaling system wherein digital signals representing more than one bit of information may be transmitted at more than two signal levels on a single transmission medium, the apparatus comprising:
- means for encoding digital values represented by sets of N bits to provide corresponding sets of P symbols, each set of P symbols being formed to reduce non-full-swing transitions between successive digital signal transmissions.

* * * * *